Aug. 27, 1935.  C. FIELD  2,012,907

METHOD OF AND APPARATUS FOR HANDLING AND SHAPING METAL WOOL

Filed Aug. 17, 1931   16 Sheets-Sheet 1

INVENTOR
Crosby Field
BY
George C. Dean
ATTORNEY

Aug. 27, 1935.  C. FIELD  2,012,907
METHOD OF AND APPARATUS FOR HANDLING AND SHAPING METAL WOOL
Filed Aug. 17, 1931  16 Sheets-Sheet 2
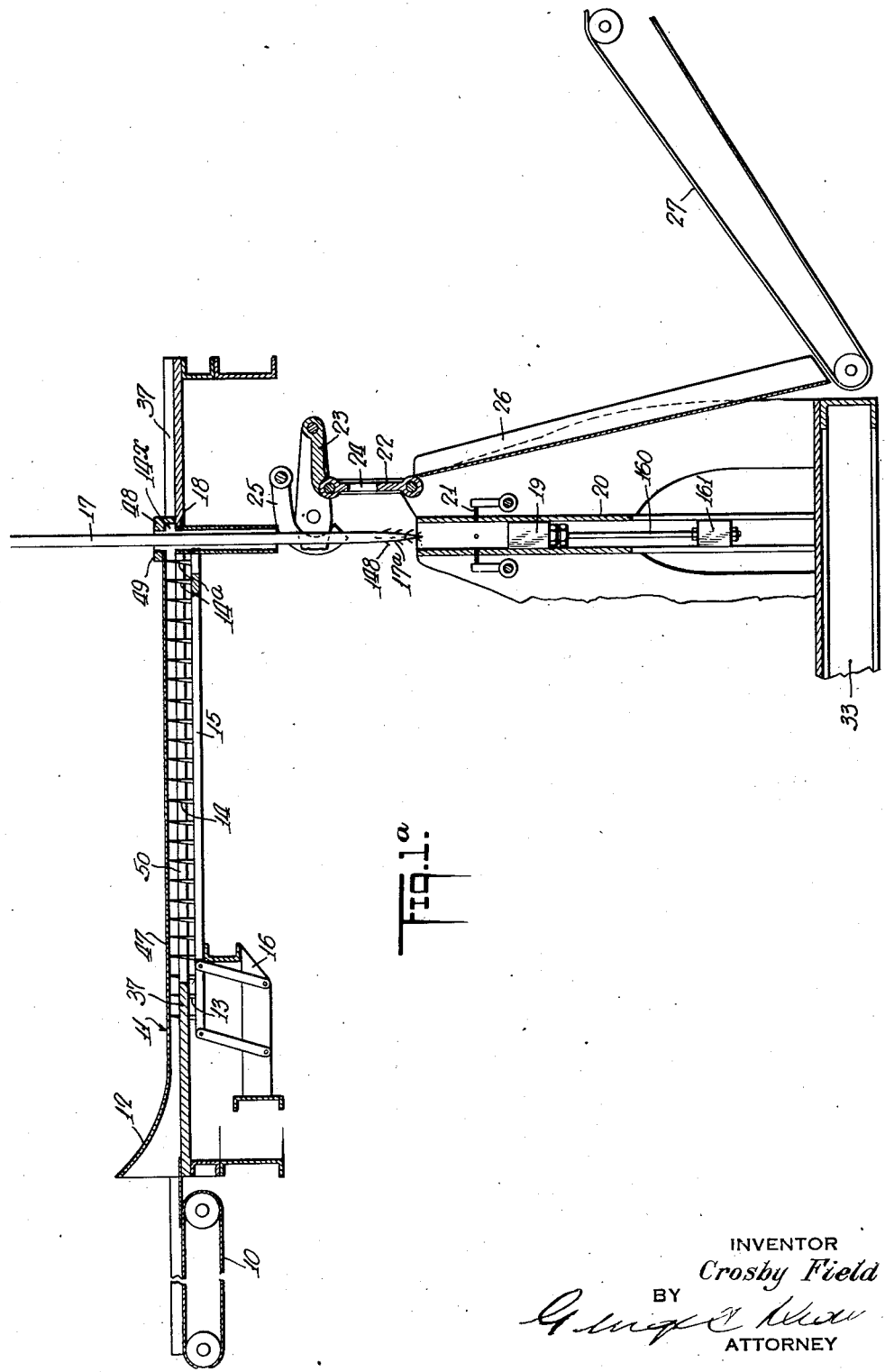
INVENTOR
Crosby Field
BY
ATTORNEY

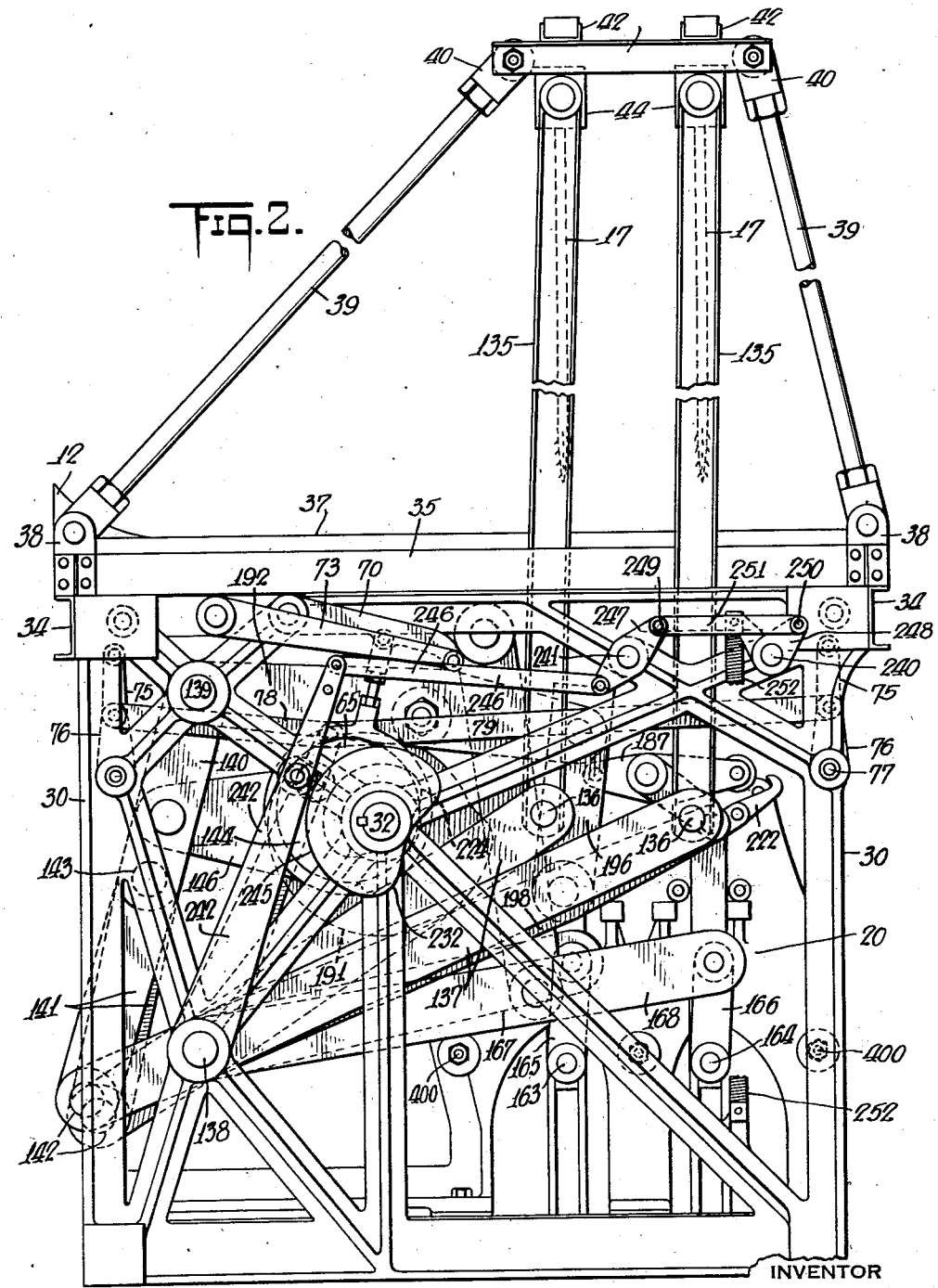

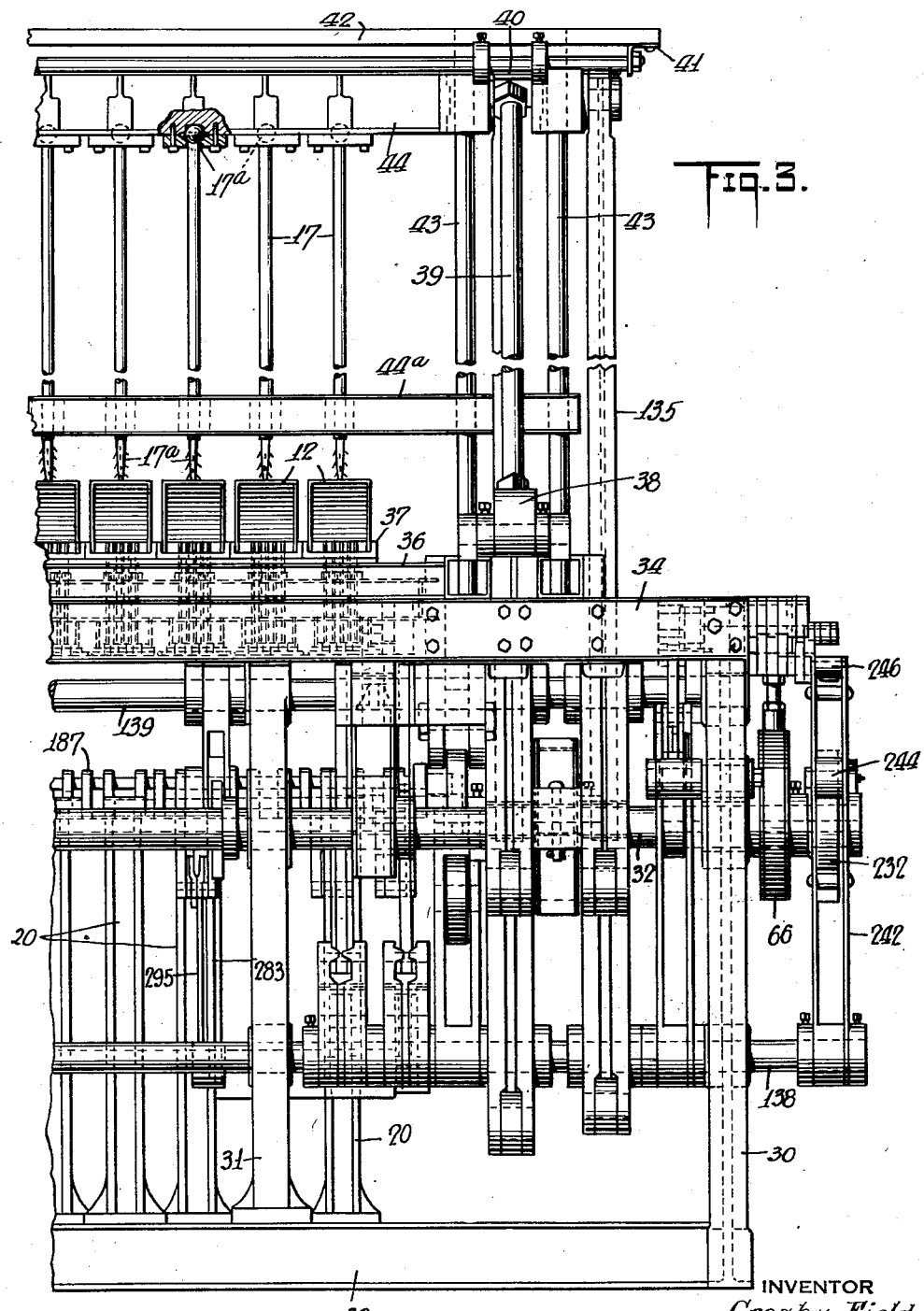

Aug. 27, 1935.  C. FIELD  2,012,907
METHOD OF AND APPARATUS FOR HANDLING AND SHAPING METAL WOOL
Filed Aug. 17, 1931  16 Sheets-Sheet 5
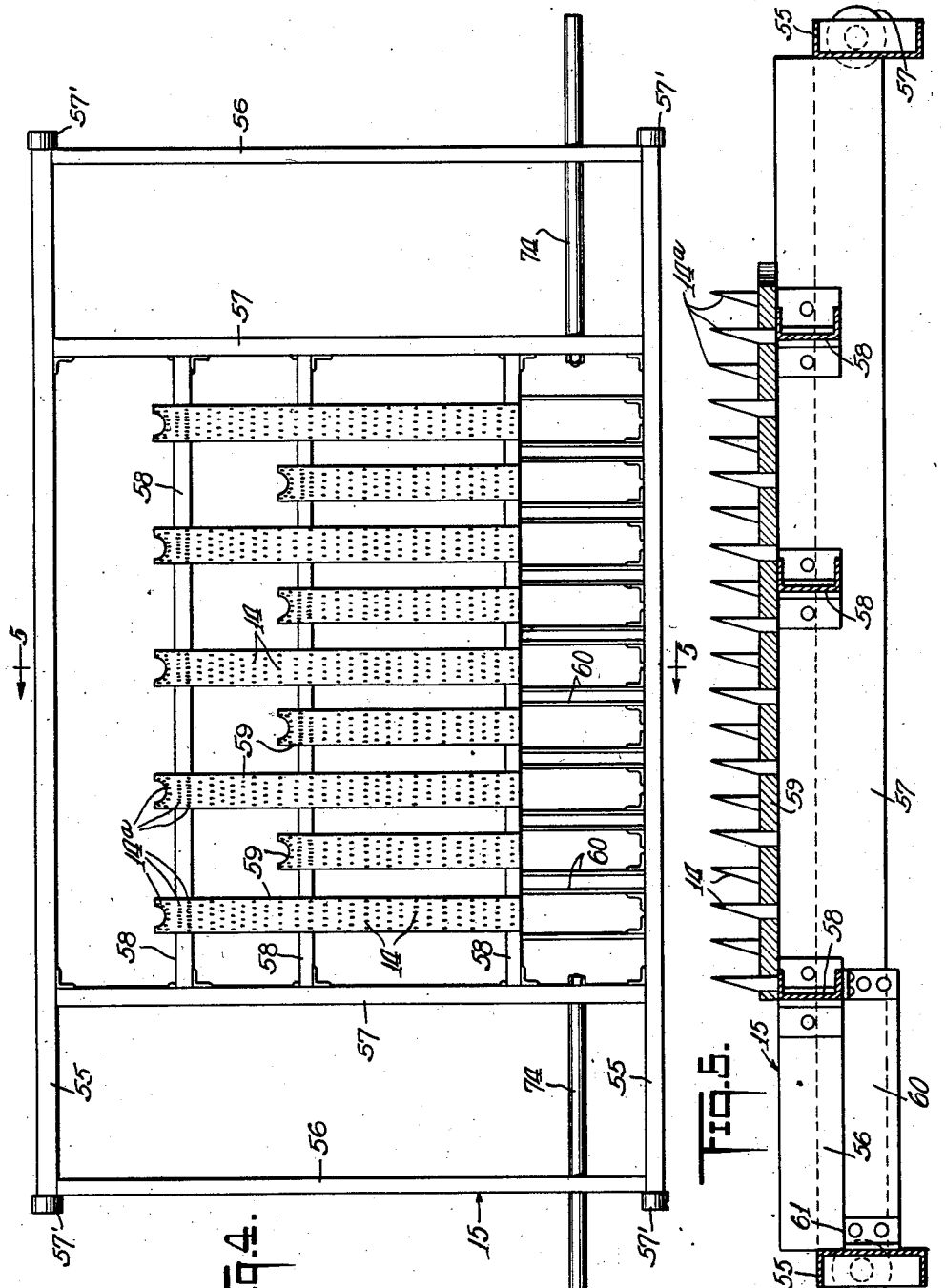
INVENTOR
Crosby Field
BY
ATTORNEY

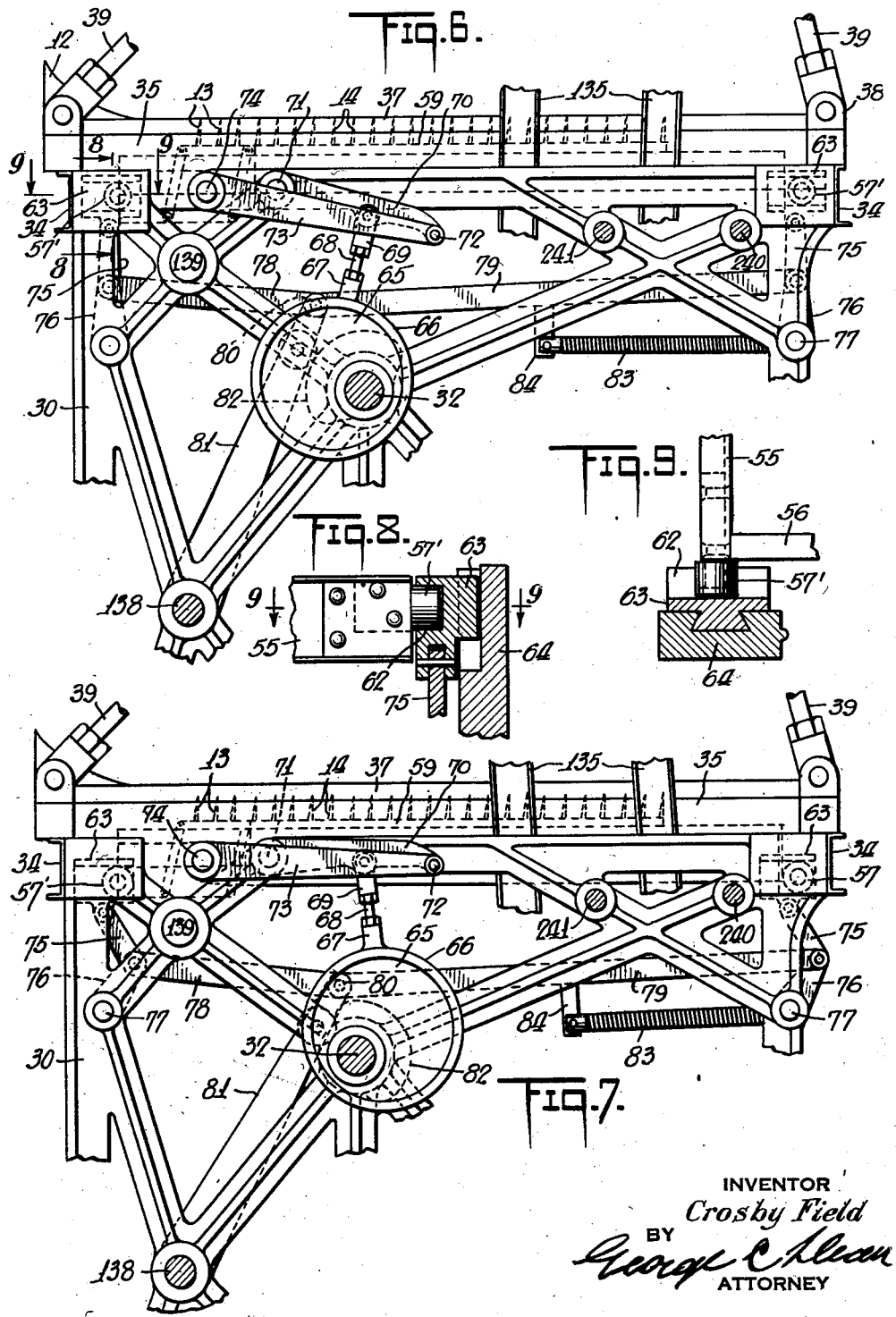

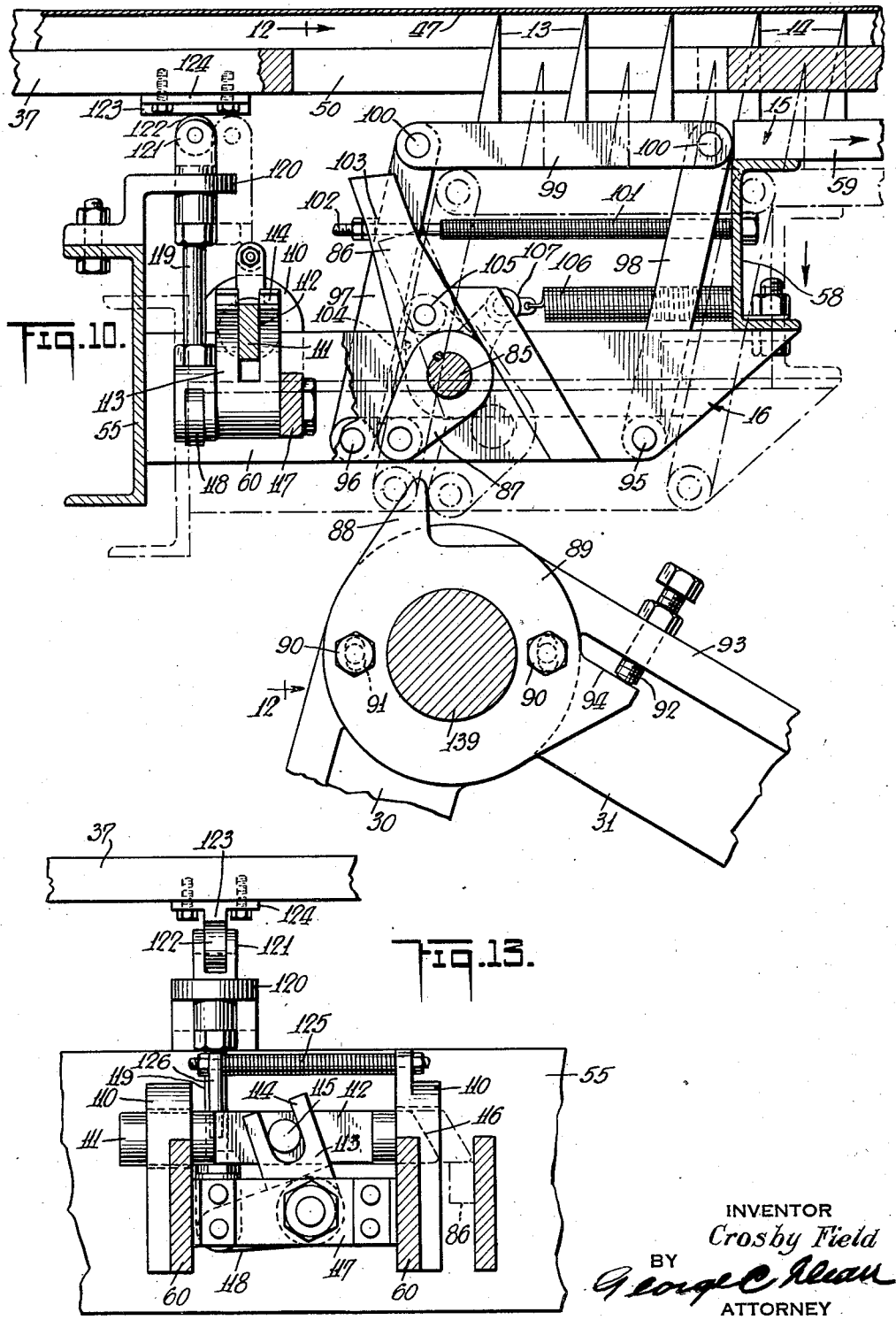

Aug. 27, 1935.　　　　C. FIELD　　　　2,012,907
METHOD OF AND APPARATUS FOR HANDLING AND SHAPING METAL WOOL
Filed Aug. 17, 1931　　16 Sheets-Sheet 8
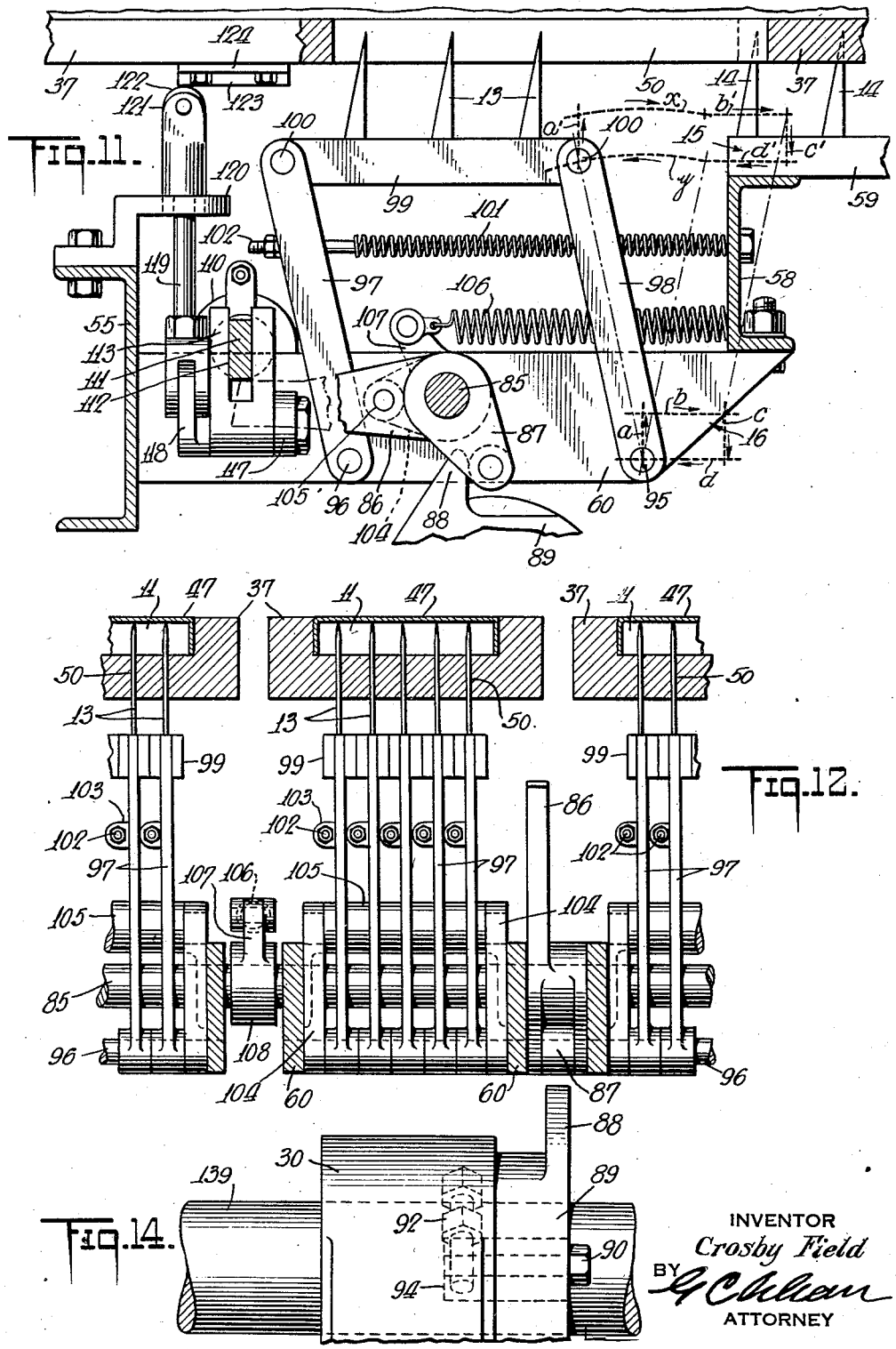

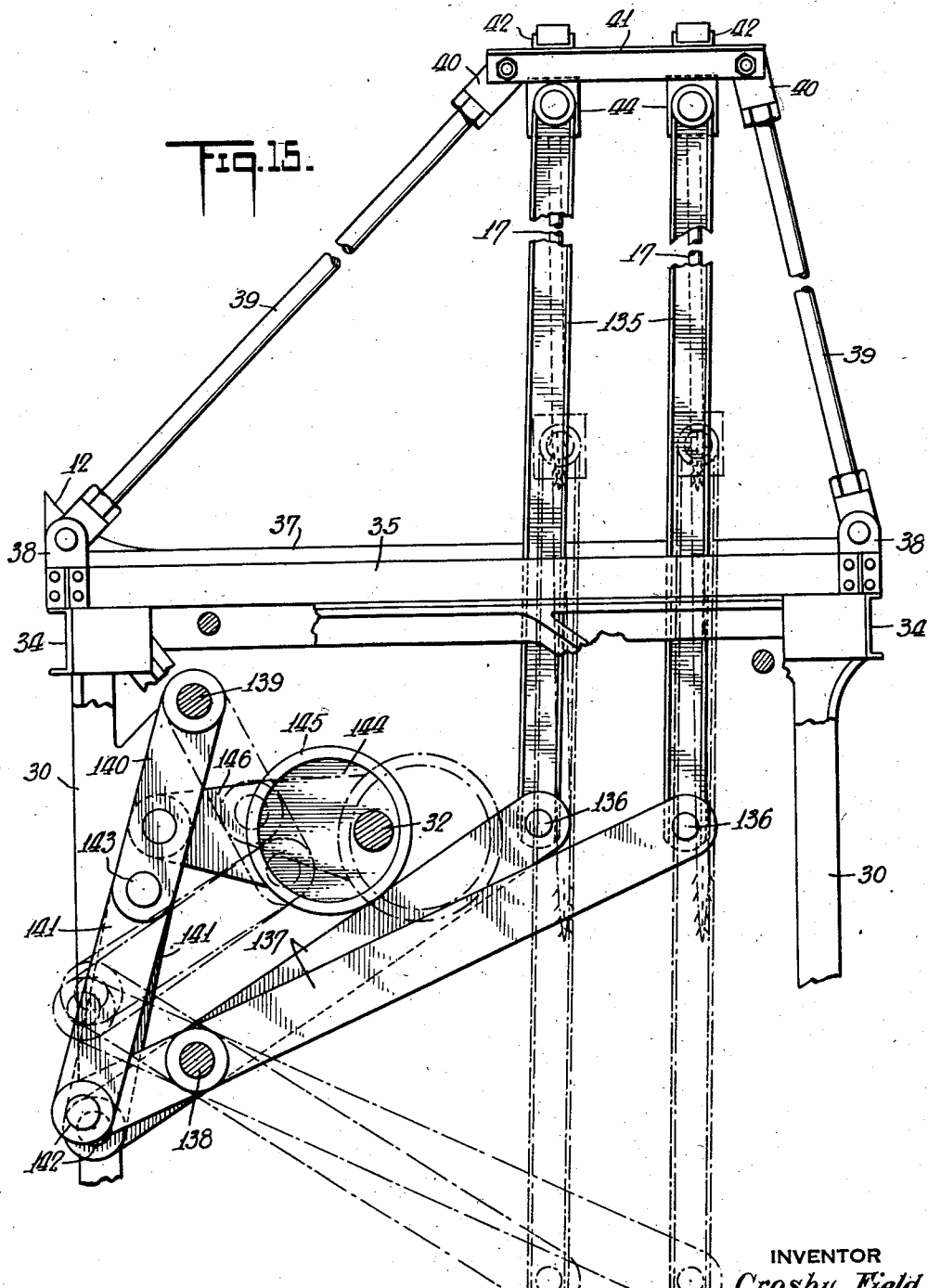

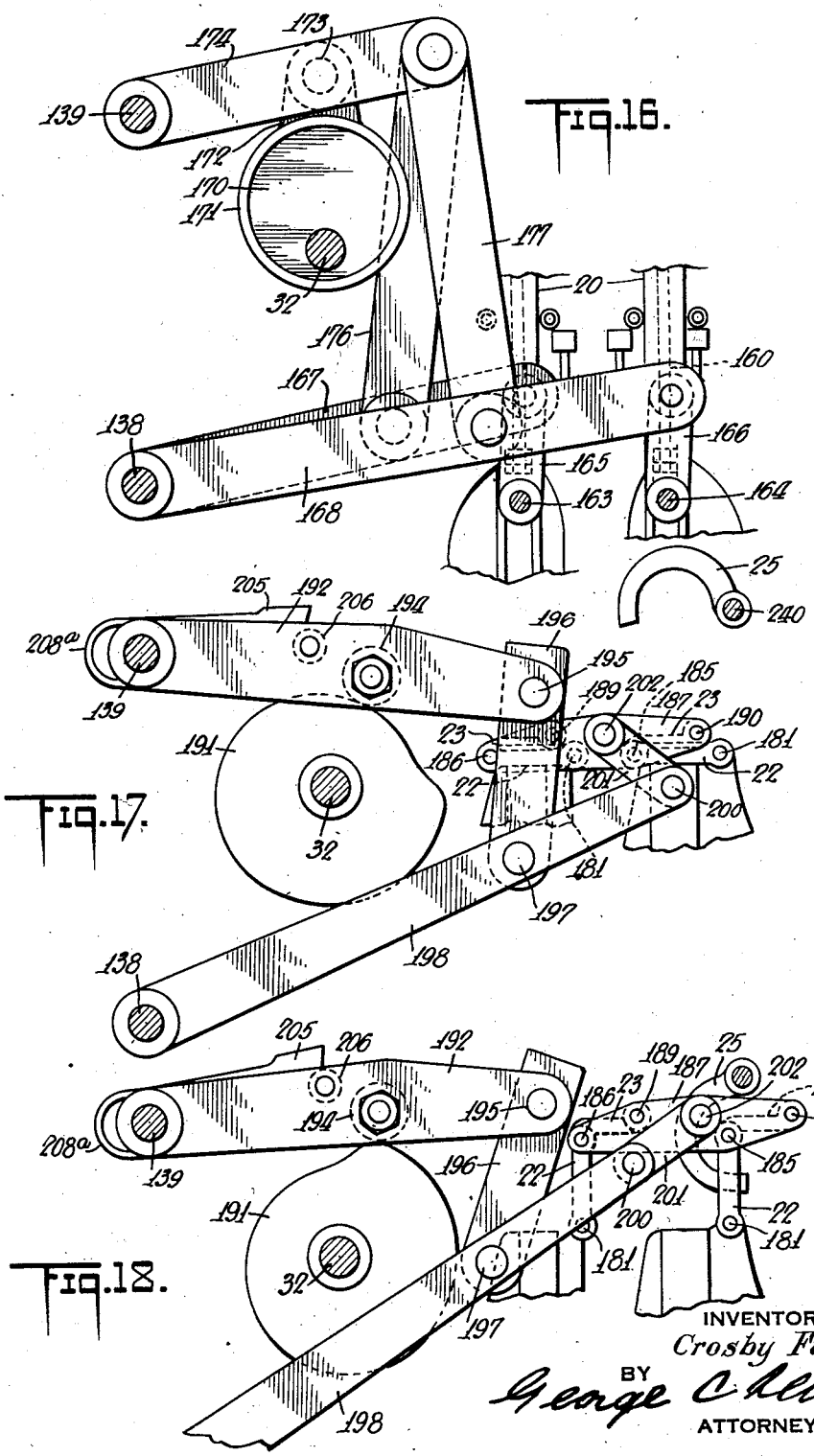

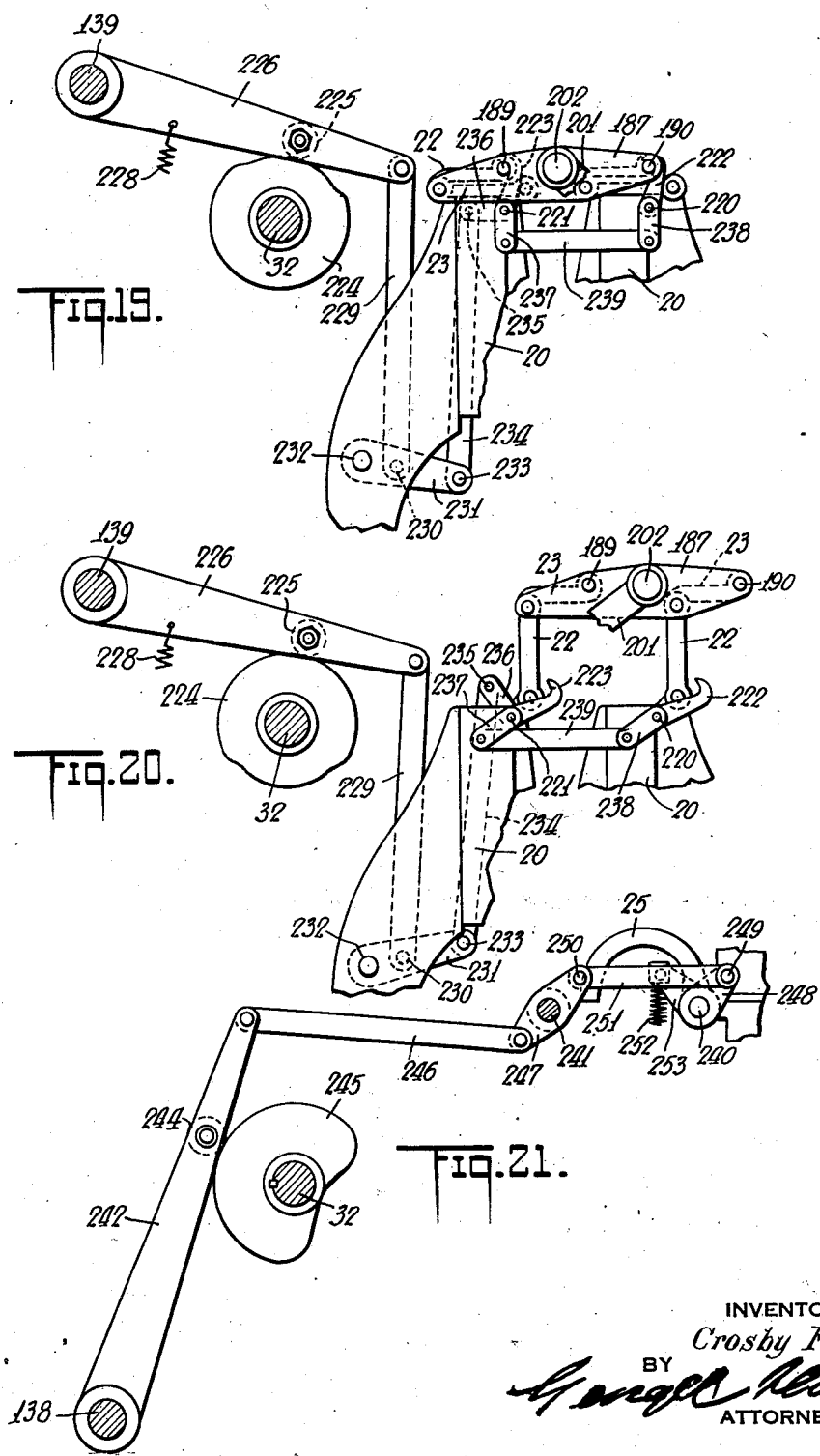

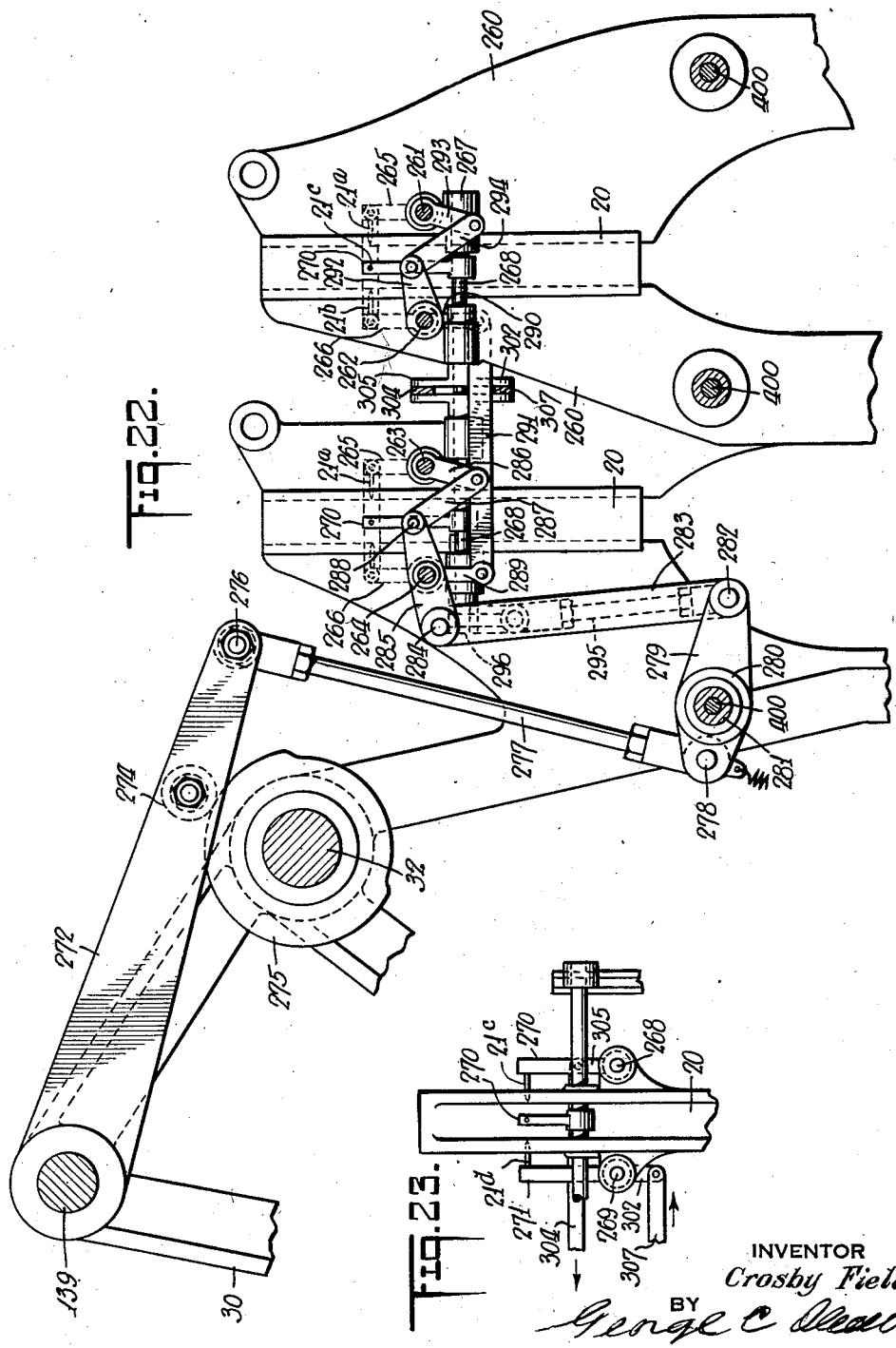

Aug. 27, 1935.  C. FIELD  2,012,907
METHOD OF AND APPARATUS FOR HANDLING AND SHAPING METAL WOOL
Filed Aug. 17, 1931  16 Sheets-Sheet 13
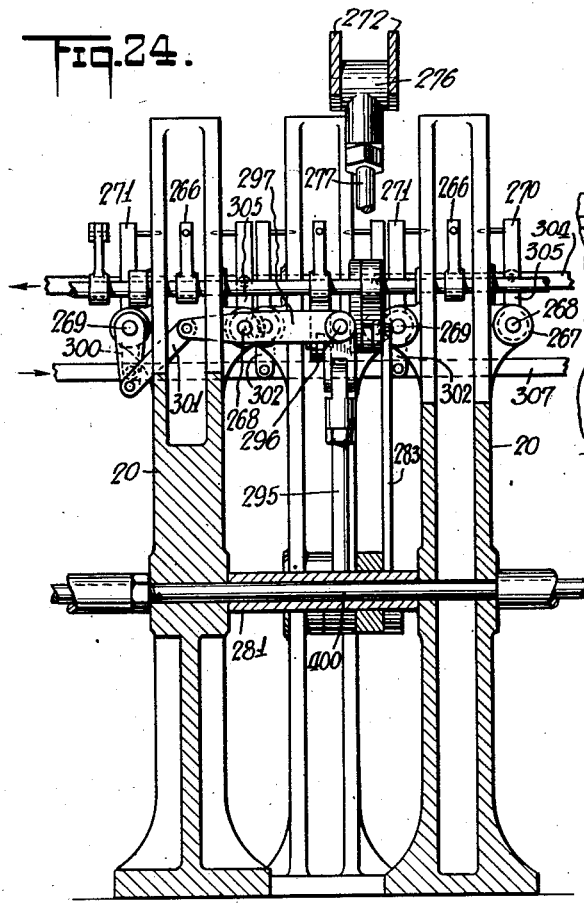
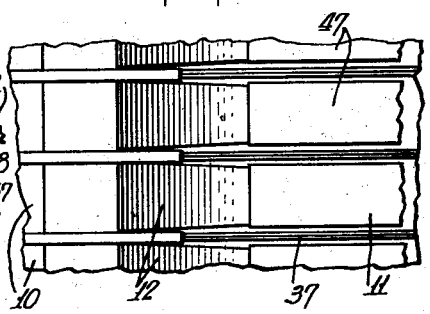
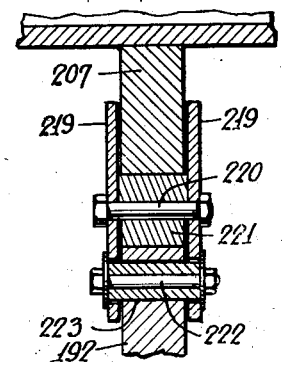
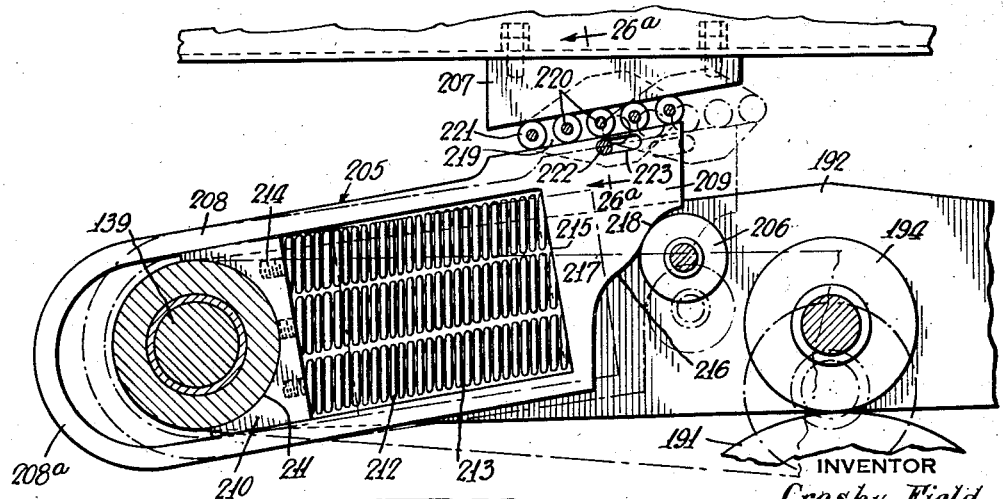
INVENTOR
Crosby Field
BY
ATTORNEY

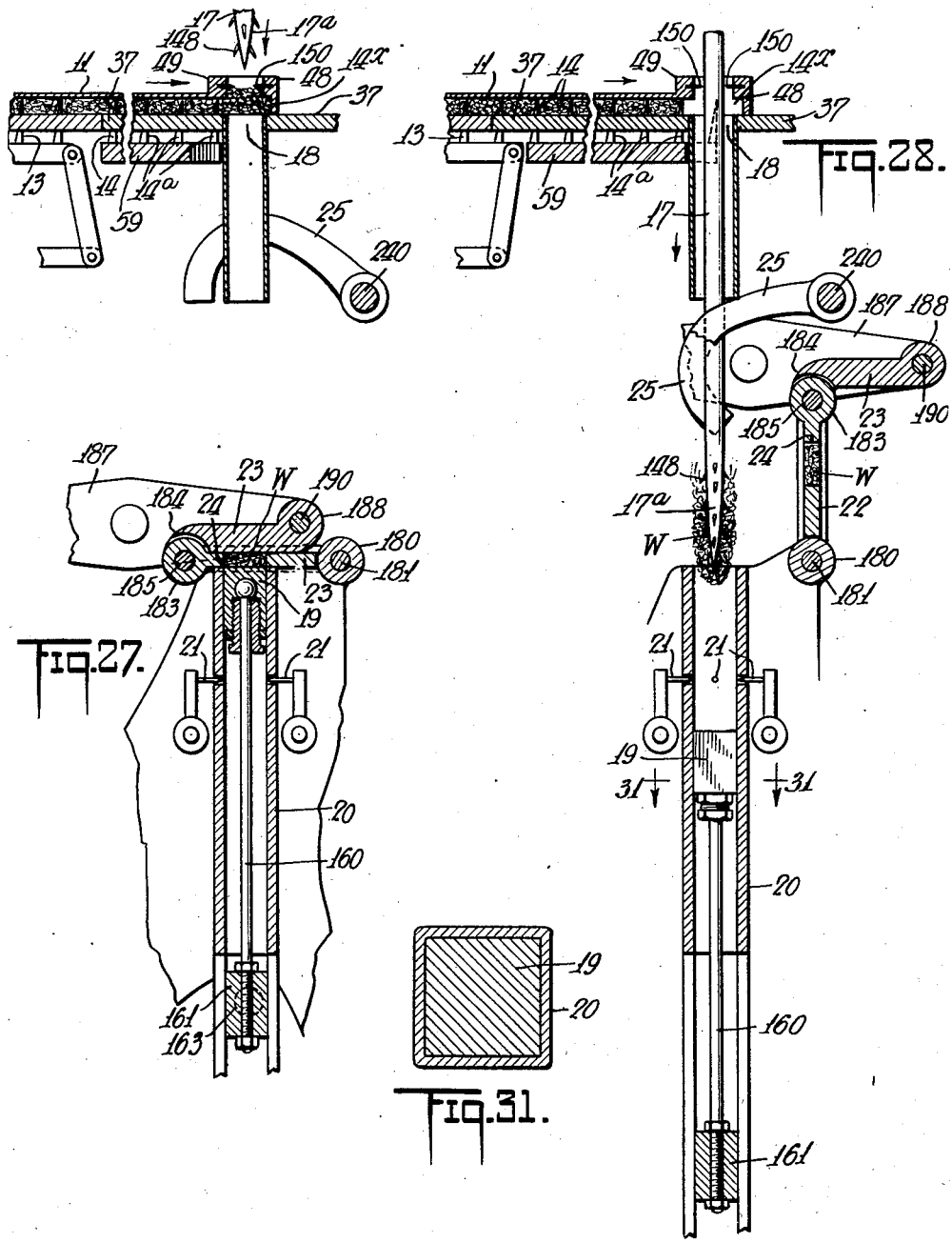

Aug. 27, 1935.  C. FIELD  2,012,907
METHOD OF AND APPARATUS FOR HANDLING AND SHAPING METAL WOOL
Filed Aug. 17, 1931  16 Sheets-Sheet 15
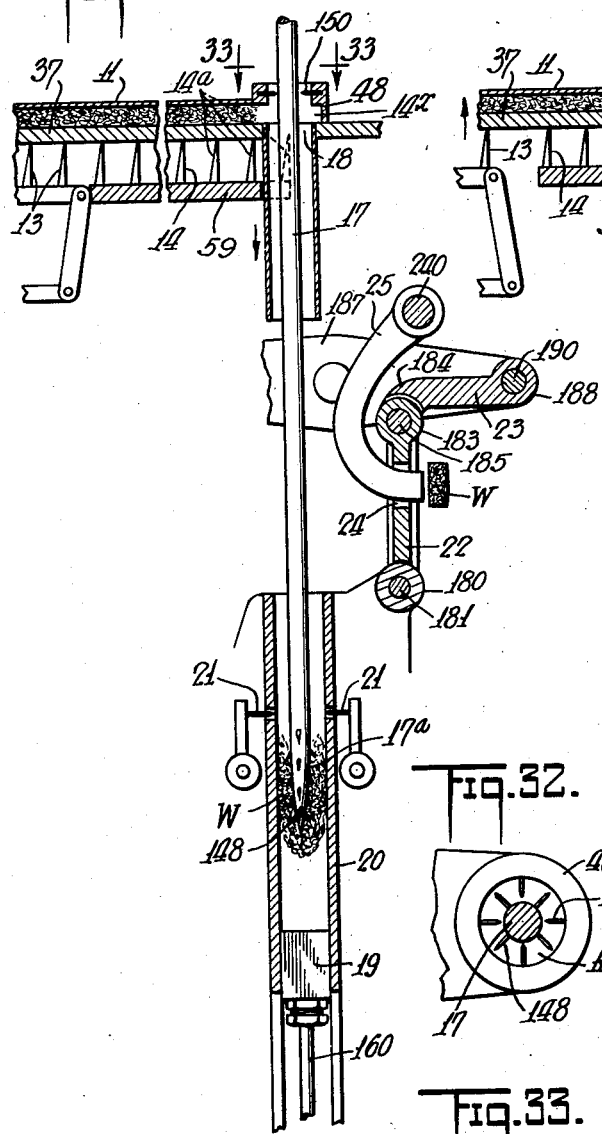
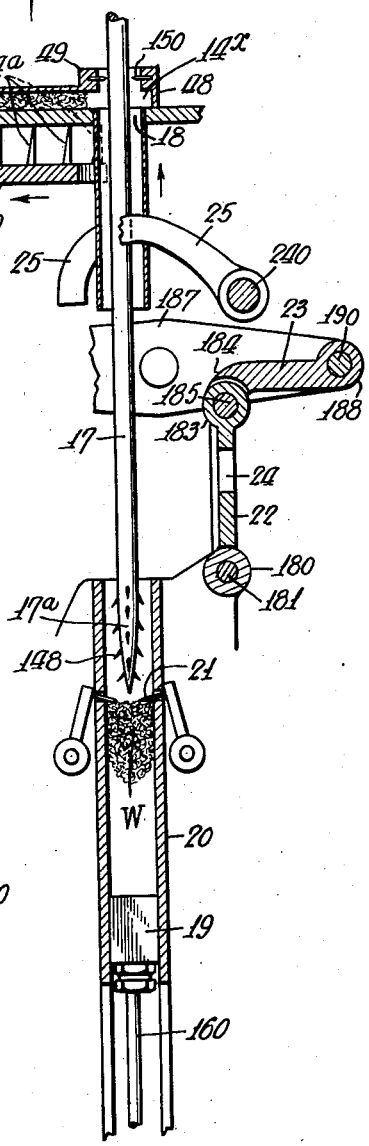
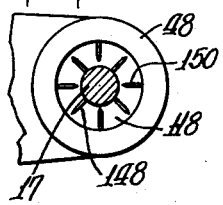
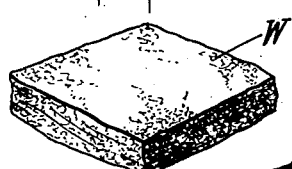
INVENTOR
*Crosby Field*
BY
ATTORNEY

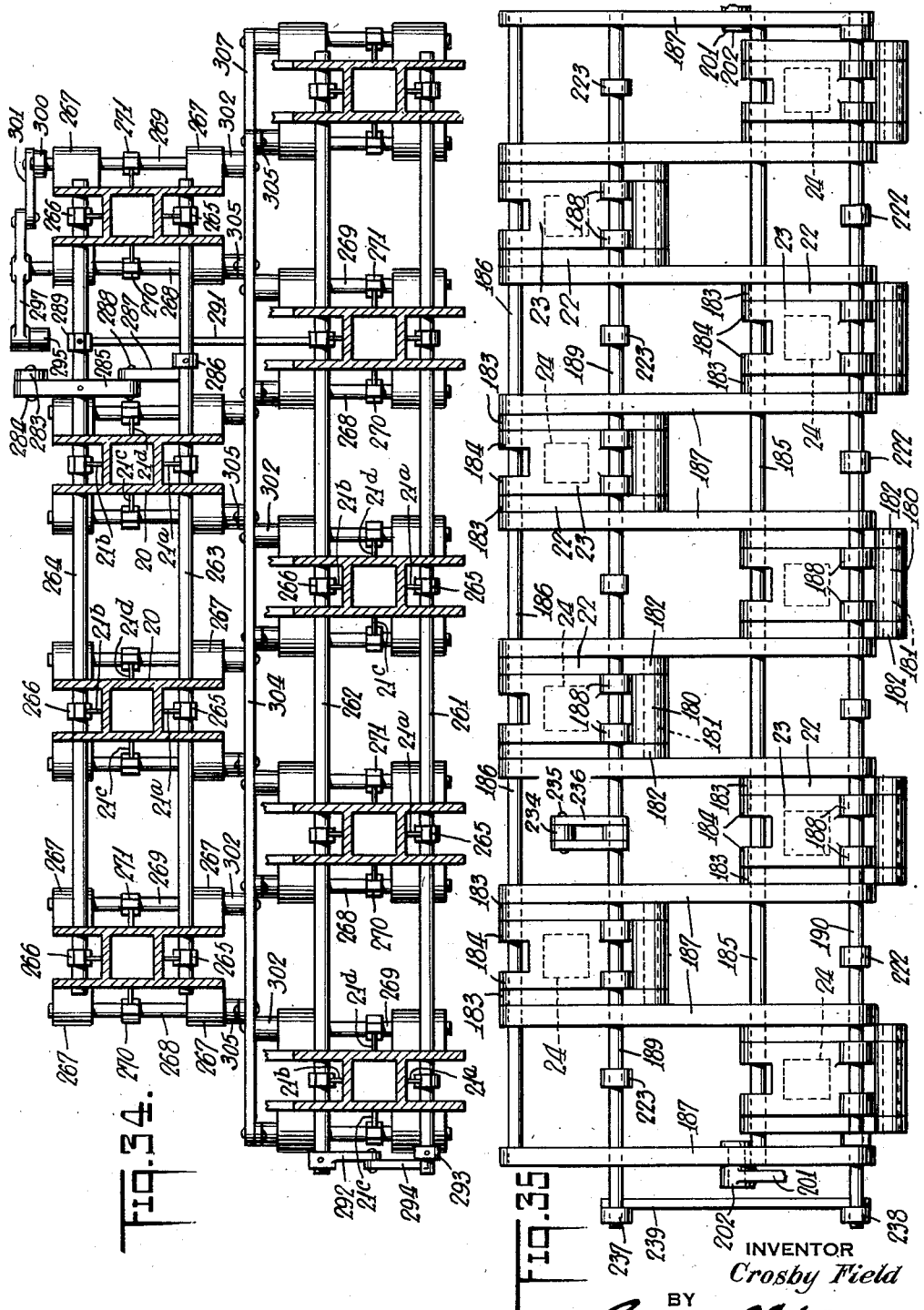

Patented Aug. 27, 1935

2,012,907

UNITED STATES PATENT OFFICE 2,012,907

METHOD OF AND APPARATUS FOR HANDLING AND SHAPING METAL WOOL

Crosby Field, Brooklyn, N. Y., assignor to Brillo Manufacturing Company, Inc., a corporation of New York Application August 17, 1931, Serial No. 557,630

41 Claims. (Cl. 29—1)

My present method and apparatus were devised primarily for handling metal wool and for forming it into pads or wads of standard shape and approximately uniform densities, even where the supply of wool is of somewhat varying density; and an important object has been to provide means for effecting these operations by automatic means, but it will be obvious that various features of my invention are applicable in other relations and for other purposes.

In present commercial practice, the wool is formed from wire by serrated cutting knives, the serrations varying from, say, 200 per inch down to 50 per inch, according to the grade of wool to be cut thereby. In any event, the fibres are of extremely minute cross-section and are more or less curly as well as springy, and considerable numbers of fibres cut by adjacent serrations are more or less intertwined in long strands, which often include knotted or matted portions. These fibres and strands collect in fluffy masses, loose bundles of which are taken to the pad or wad forming machines. Heretofore, these machines have consisted of simple single mold presses, into which portions of this wool are charged and the compressed pad removed by hand operators, and the uniformity of the product has been dependent entirely on the skill of the operator in manually plucking the right amount of wool from the supply bundle. Even experienced operators were not able to produce pads of very uniform density or thickness because, however skillful they might be in judging the quantity of wool, each portion is so light that judgment of uniformity of its weight is extremely difficult; the more so because of the irregular density and the sometimes matted condition of various portions of the wool supply. Because of the stubborn, springy quality of the fibres, it is impractical to manually fluff out and uniform the denser portions.

The problem of securing sufficiently uniform density is complicated by the fact that it is undesirable to subject the wool either to cutting operations or to compacting pressures beyond the elastic limit of the fibres, because the presence of an excessively large number of broken strands and projecting ends in the completed product is undesirable on account of the danger of scratching or pricking the fingers of the user.

It is among the objects of the present invention, therefore, to provide a method and apparatus for utilizing the large non-homogeneous bundles of wool as they come from the wool making machines, and after but slight manual prepara- tion, subjecting them to what might be called a mechanical homogenizing process, that is to say, a process that renders the density of the wool substantially uniform. I then segregate small uniform quantities of wool from this uniformly dense product and form them into wads or balls or pads of correct size and shape. These results are accomplished without resorting to the use of heavy pressure or shearing mechanism.

Another object is to provide a machine for such purposes, which is fully automatic, except for a simple preliminary operation wherein the bundles are elongated and thinned into crude, non-uniform relatively thick strips or ribbons, which are continuously supplied to the intake end of the machine. This operation affords ample opportunity for inspection and rejection of non-uniform or otherwise defective or dirty wool, as well as any foreign matter.

Another object is to provide such a machine in which the operation of homogenizing the inspected but crude, non-uniform supply into a continuous strip or ribbon of uniform density and cross-section; and the further operations of subdividing the ribbons, shaping the segregated portions and ejecting the completed pads, may be accomplished with great rapidity.

In accordance with a preferred embodiment of the invention, the machine is arranged so that a continuous line of manually formed supply strip is fed by a conveyor into a channel or tunnel and then through the same by needles mounted on intermittently acting, four-motion feed mechanism, whereby the cross sectional area and the density of the strip are rendered uniform. Preferably, there are two sets of feed needles on the carrier, one set fixed and another set in which laterally adjacent needles are independently spring pressed forwardly. All needles of this set are positively retracted to tension their springs during the low-level retraction of the four-motion carrier and, when moved into engagement with the wool supply adjacent the mouth of the tunnel, are suddenly released, thereby leaving their equal tension individual springs free to each independently control its distance of forward feeding of the wool toward the other fixed needles on the same carrier. As a result of this action, the extent of movement of each separately resilient needle or train of needles will be inversely proportional to the resilience of that particular portion of the wool which each is trying to push forward relatively to the non-resilient needles. Hence, when any one of them engages wool of density (resilience) greater than that being engaged by a laterally adjacent needle, the former needle will lag behind, out of lateral registry with its neighbor, and this will permit the denser wool to partly stretch and partly slip laterally out of the path of the needle that is pushing it. The spring needles also act as packing needles. That is to say, after each length of supply strip has been acted on as above, by one stroke of said spring needles, it will be caught between the foremost of the packing needles and the rearmost of the rigidly held needles, on the succeeding stroke, and when the spring pressed packing needles are released, they will push said wool forward such distance as their springs can force them against the increasing resilience of the wool. The springs being adjusted to desired constant resilience, the wool will be compressed to uniform resilience, that is uniform density.

After the spring stroke of the spring needles is completed, both they and the relatively fixed needles move forward together, at the same rate of speed.

All of the so-called "needles" are preferably thin, tapered blades, having their front edges vertical, so that all the taper is at the rear edge, and they all move vertically into the ribbons, advance, withdraw, retreat and reenter, by relatively short steps. Consequently, the wool is wedged rearwardly, then suddenly driven forward by the blades, at very short intervals, say, 10 to 20 times during its travel through the tunnel. As the wall friction is very substantial, particularly the starting friction, the result is to sharply bend the fibers around the front and rear edges of the needles, the intermediate portions of the fibers tending to become set parallel with the direction of feed.

At the discharge end of the tunnels, the leading end of the ribbon is delivered to a tearing mechanism including thickly set holding needles arranged to surround the open upper end of a downwardly extending tear tube, when the feed bed is at the forward end of each feed stroke; and cooperating therewith a vertically reciprocating downwardly barbed dart that drives the end of the ribbon downwardly into a tear tube. The tube is of proper size so that the wool carried by the dart, snugly fits the tube and is torn from the end of the ribbon engaged by the holding needles and driven downwardly into a receiving tunnel where it is stripped from the dart upon the retracting stroke of the latter. A plunger then drives it into the die, where it is formed into a pad or the like, being automatically ejected before the next wad of wool is carried downwardly by the dart.

The density and volume of the wool presented by the feed mechanism being substantially the same for each stroke of the dart, the wool pulled off is very closely the same both in volume and weight. This measuring by tearing avoids any clean cut directly through the ribbon such as would sever the spiral fibers into many small pieces.

In the forming dies, the pressure exerted is merely sufficient to compact the subdivided mass of wool and press it into generally rectangular or circular or oval shape as the case may be, without destroying the resiliency of the mass and without breaking the fibres thereof.

An important feature of the invention, is the compact arrangement for unitary operation of a large number of parallel troughs or tunnels, with unitary driving means for their four-motion feeding arrangements terminating alternately in two banks of dart and mold mechanisms.

The above and other features of my invention will be more evident from the following description in connection with the accompanying drawings, in which Fig. 1 is a perspective view of a machine embodying the invention;

Fig. 2 is a side elevational view or end view of the machine;

Fig. 3 is a fragmentary rear elevational view of the machine;

Fig. 4 is a plan view of the movable table which mounts the wool conveying needles;

Fig. 5 is a transverse sectional view therethrough, taken approximately on the line 5—5 of Fig. 4;

Fig. 6 is a side elevational view illustrating the mechanism for operating the needle carrying table, this view showing the table just at the start of the feeding stroke thereof;

Fig. 7 is a view similar to Fig. 6 but illustrating the position of the table and its actuating mechanism after the completion of the feeding stroke and after the table has been lowered and is ready to be retracted prior to reentry of the needles into the material;

Fig. 8 is an enlarged sectional detail on the line 8—8 of Fig. 6;

Fig. 9 is a sectional detail on the line 9—9 of Fig. 8;

Fig. 10 is an enlarged side elevational view of the packer needle mechanism showing in full lines the position of this mechanism subsequent to release of the springs; and in dotted lines, the position of the mechanism when the packer needles have been completely retracted from the wool;

Fig. 11 is a view similar to Fig. 10, but illustrating the position of the parts at the end of the retracting stroke and just as the packer needles are about to begin their upward movement to reenter the wool ribbon;

Fig. 12 is a rear elevational view showing several sets of packer needle mechanism and taken approximately on the line 12—12 of Fig. 10;

Fig. 13 is a view of the packer needle latch mechanism taken approximately at right angles to the showing of such mechanism in Figs. 10 and 11;

Fig. 14 is a view taken approximately at right angles to Fig. 10 and illustrating the stationary guiding cam for the latchable operating crank of the needle packing mechanism correctly related with the mechanism which appears above it in Fig. 12;

Fig. 15 is a side elevational view illustrating in full and in dotted lines the two extreme positions of the mechanism which operates the dart-carrying cross heads;

Fig. 16 is a side elevational view illustrating the mechanism which operates the plungers of the padding dies;

Fig. 17 is a side elevational view of the mechanism which operates the movable sections of the forming dies, the latter being shown in closed position;

Fig. 18 is a view similar to Fig. 17 but showing the position of the parts when the dies are open;

Fig. 19 is a side elevational view of the mechanism for operating the die latches and showing the dies closed and latched;

Fig. 20 is a similar view but showing these latches released and the dies opened;

Fig. 21 is a side elevational view of the cam actuated lever train which operates the pad ejectors;

Fig. 22 is a side elevational view of the mechanism for operating the movable stripper fingers;

Fig. 23 is a view of the stripper finger mechanism of one of the cylinders but taken approximately at right angles to Fig. 22;

Fig. 24 is another view of the stripper finger mechanism taken approximately at right angles to Fig. 22; and showing the position of the parts when the fingers are retracted;

Fig. 25 is a fragmentary top plan view showing the inlet ends of the troughs;

Fig. 26 is an enlarged side elevational detail of the resilient shoe and ramp mechanism which is utilized to maintain the die operating lever against its cam;

Fig. 26a is a sectional view taken on the line 26a, 26a, Fig. 26;

Fig. 27 is a transverse sectional view showing the manner in which the advance end of the ribbon is moved into position for segregation by the dart;

Fig. 28 is a view similar to Fig. 27 but illustrating also the die and stripper finger mechanism and showing the dart carrying the wad of wool into the cylinder;

Fig. 29 is a view similar to Fig. 28 showing the position of the parts after the dart has entered the cylinder and carried the wad below the stripper fingers and showing the ejector mechanism kicking a previously formed pad out of the die;

Fig. 30 is a view similar to Fig. 29 but showing the dart on its up stroke after its wad has been stripped therefrom by the stripper fingers;

Fig. 31 is a transverse sectional detail through one of the cylinders on the line 32—32 of Fig. 28;

Fig. 32 is a sectional plan view on the line 33—33 of Fig. 29, showing the coaction between the stationary stripper fingers and the barbed dart;

Fig. 33 is a perspective view of one of the finished pads;

Fig. 34 is a sectional plan view of the cylinders taken in a plane below the cylinder tops but above the stripper needles; and Fig. 35 is a top plan view of the movable die mechanism showing the dies in closed position.

General operation

Figure 1:
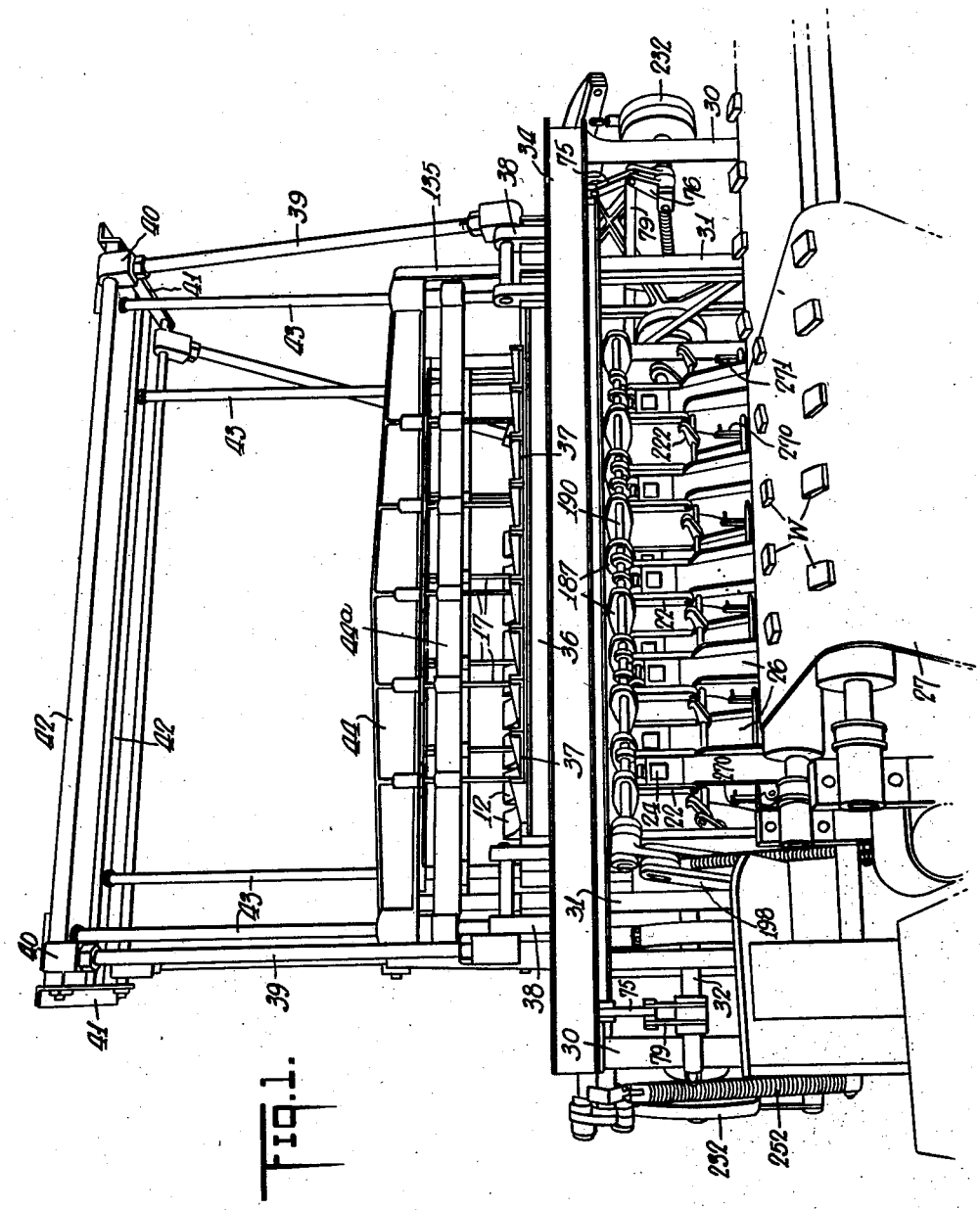
Fig. 1a is a somewhat schematic view in vertical longitudinal section, disclosing diagrammatically series of mechanisms which successively operate upon the wool from the time it enters the machine as a crudely formed ribbon, until it leaves the machine in the form of small pads.

The relation of the complete train of mechanism which successively operates on the steel wool from the time it enters the machine until the time it leaves it in the form of properly shaped wads or pads of material is illustrated schematically in Fig. 1a.

The operators place the crudely hand formed steel wool ribbon on a conveyor belt 10 at the rear of the machine. In order to maintain the greatest uniformity of density in the finished product, the hand shaped ribbon should preferably have a density of between one-half and twice the density of the finished product, the automatic mechanical homogenizing action of the packer needle mechanism being capable of conveniently converting a ribbon kept within these limits into a ribbon of substantially uniform density.

From its belt 10, Fig. 1a, each ribbon passes into its tunnel 11 through the flaring mouth 12 thereof (see also Fig. 3). In each tunnel a set of feed needles 14 is fixed on a table 15, which, with base plate 16, has a four-way movement indicated by schematic lines a, b, c, d, Fig. 11. A cooperating set of packer needles 13 is yieldably mounted on base plate 16, so that said packer needles have an independent longitudinal movement superposed on the four-motion feed of said table 15. The latter movement brings all needles 14 and 13 into feeding engagement with the wool but needles 13 are under spring tension and operate to homogenize the wool and then press it forward against needles 14.

The base 16 and table 15 cause the needles 14 to trace the rectangular path, a, b, c, d, Fig. 11. They all move along lines parallel with a, upwardly through slits in the tunnel bottom and impale the ribbon. They then move forwardly to advance the ribbon parallel with b. They then withdraw downwardly parallel with c and move back through a horizontal path, parallel with d, ready for another up thrust to again re-enter and impale the ribbon at a new point and advance it another step.

The packer needles 13 have similar movements except that their horizontal movement is through a greater range and except that they are non-positively impelled through separate springs. That is to say, when the two sets of needles have been entered into the mass, the packer needles which have been previously latched against the tension of their actuating springs are suddenly released and their springs draw them swiftly forward, each to a point determined by the increasing density (resilience) of the wool which it compresses against the rearmost conveyor needles 14. After this spring actuated compression stroke of these needles 13 has been completed, they move forward together with the conveyor needles 14 and assist in advancing the ribbon.

Continuing the general description of operation in connection with Fig. 1a, it is to be noted that as the ribbon reaches the end of the tunnel after a forward feed stroke (Fig. 27), a barbed dart 17 moves downwardly through a tear tube 18 in the tunnel bottom, carrying with it a wad of wool from the end of the ribbon (Fig. 28). This wad is deposited over a plunger 19, arranged in cylinder 20 and forming the movable bottom of a pad forming die structure. As the dart 17 starts its upward motion, stripper fingers 21 work through the wall of the cylinder 20, stripping the wool wad from the dart. After the dart has been retracted, the two part die top structure 22, 23, is folded down upon the top of the cylinder 20 and latched in position. The plunger 19 rises, pressing the wool into the opening 24 of the forming die section 22. Thereafter the hinged die sections are swung to the open position illustrated in Fig. 1a and the kicker element 25 swings down, ejecting the finished pad from the mold opening 24 in which it is frictionally held. The ejected pad slides down the chute 26 and is carried off on the conveyor belt 27 to its point of inspection and packing.

Machine frame work (Figs. 1, 2, and 3)

The machine includes a pair of upright end frames in the nature of skeleton castings 30, which cooperatively with any suitable number of standards 31, provide bearings for the main shaft 32. Castings 30 at their lower ends, are preferably connected by one or more substantial cross beams 33 upon which the standard or standards 31 are mounted and the upper corners of the end castings 30 are connected by suitable longitudinally extending massive channel bars, such as 34, the latter in turn being rigidly united by horizontal frame bars 35.

Mounted upon the tops of the channel bars 34, are longitudinally extending channel frames 36, of less massive construction. Extending fore and aft of the machine and with their ends mounted on the frame bars 36, are a plurality of up-turned channel pieces 37 arranged in laterally abutting relationship. The rear portions of these channel pieces cooperate in forming the tunnels through which the ribbons of metal wool are passed during the operation of the machine, but in addition to this function, the members 37 add generally to the rigidity of the structure.

Rising from the upper forward and rear corners of the machine and connected to suitable brackets 38, are braces 39, the enlarged upper ends 40 of which are bolted to horizontal rigid angle iron cross pieces 41 disposed well above the channel bar plates 37. The ends of the frame members 41 at their point of junction with the rods 39, are connected by the longitudinally extending rigid frame bars 42, two of these bars being employed and arranged one behind the other. Each of the bars near its end provides a rigid point of attachment for the upper end of a vertical guide rod 43. Travelling upon these guide rods, are a pair of cross heads 44, each carrying a set of darts 17, the details of which will be more fully hereinafter described. The darts are guided through suitable sleeves in longitudinally extending guide frame bars 44a carried by standards 43. The darts may have ball joints 17a (Fig. 3), pinned to prevent axial rotation.

The main shaft 32, which has been previously referred to, is driven from any suitable source and upon this shaft, are mounted the cams which directly or indirectly control the actuation of nearly all of the operating parts of the machine, such for instance, as the packing needles, the movable needle table, the cross heads and their darts, the plungers 19, the stripper fingers 21, the ejector 25 and the folding die structure 22, 23. Due to the considerable number of levers and cams and links and shafts which are employed to operate these various mechanisms from the main shaft, the modus operandi of the various parts can be better understood from separate detailed illustrations thereof.

The tunnels (Figs. 1, 1a, and 25)

The bottoms of the tunnels 11 are preferably formed by the upwardly facing channel pieces 37, and complementing these channel pieces are the hood portions 47, which are provided with the flaring mouths 12 above referred to and with flanged sides fitting within the channel pieces 37 and extending from the rear thereof to a point adjacent the discharge openings at 18 in the channels. The hoods terminate abruptly against an abutment plate 48, constituting part of a collar 49 through which the darts 17 pass.

The channel members 37 are provided with a longitudinally extending series of slots 50, through which the packer needles 13 and the conveyor needles 14 work to engage and operate upon the ribbon of wool.

The conveyor needles and their supporting and operating mechanism (Figs. 4 to 9)

The first needles to operate upon the wool, as it enters the tunnels, are the packing needles 13 which serve to render the density of the wool substantially uniform. Inasmuch, however, as the special mechanism for these needles is carried by the same table as that which bears the conveyor needles, the invention may be more readily understood by describing the details of this table and its mode of operation.

The table which is shown in top plan view and longitudinal section in Figs. 4 and 5 respectively, includes a relatively large rectangular frame consisting of the front and rear frame members 55 and the side frame members 56. The extended ends of the bars 55 are provided with rollers 57. Inwardly of the bars 56, are bars 55 connected by frame members 57, parallel with bars 56. The members 57 are connected by any suitable number of longitudinally extending frame bars 58, which provide a support for the table plates 59, which carry the staggered sets of conveyor needles.

The rearmost of the cross frame bars 58 is connected to the rear frame bar 55 by a series of vertically disposed plates 60, which as will be noted in Figs. 10 and 11, serve to mount the carrying mechanism and actuating mechanism for the packer needles 13.

Two sets of plates 59 of different length are shown, one set consisting of five plates and the other of four. The needles 14 are fixedly mounted upon the plates and work through the slots in the tunnel bottom as previously described. The mechanism for actuating the table consisting of the various frames 55, 56, 57 and 58 and the plates 59, and for correspondingly actuating the members 60, which are secured by brackets 61 to the bars 55 and 58, may be best seen from Figs. 6 to 9 inclusive.

The rollers 57' are arranged to travel in horizontal grooves 62 in blocks 63, the latter in turn sliding in blocks 64, fixed to the upper corners of the end frame castings 30 of the machine. The mechanism for imparting the desired four-way motion to the table so that the conveyor needles may perform their function of intermittently advancing the ribbons through the tunnels, consists of means for periodically, vertically, reciprocating the blocks 63 and intermittently horizontally reciprocating the table with respect to the blocks.

The desired fore and aft movement is imparted to the needle carrying table through the instrumentality of an eccentric 65 fixed upon the main shaft of the machine and rotating within a circular collar 66, having a lug 67 connected by bolt 68 or otherwise to an extension 69 of a lever 70 pivoted at 71 on the end casting 30. The free end of the lever 70 is pivotally connected at 72 to the free end of a lever 73 fulcrumed on a shaft 74, projecting laterally from the table structure. Two sets of eccentrics and levers are provided for coaction with the two shafts 74, which as seen from Fig. 4, are rigidly mounted in the frame bars 56 and 57, and project laterally therebeyond.

It will be apparent that inasmuch as the pivot 71 is fixed to the frame and the pivot 74 fixed to the movable table, the operation of the eccentric tends to alternately increase and lessen the distance between the pivot points 74 and 71 and thereby impart the desired horizontal, translational movement to the table, such motion being permitted by the arrangement of the rollers 57' in the grooves 62.

The mechanism for imparting the up and down motion to the table, includes pairs of toggle levers arranged at the corners of the machine. One toggle lever 75 of each pair, is pivotally connected at one end to one of the blocks 63, the other toggle lever 76 of each pair has a stationary pivot as at 77 on the end casting and its free end is connected to the opposite toggle 75.

A pair of links 78 and 79 have a common pivot 80 at the free end of a lever 81, actuated by a cam 82, turning with the main shaft of the machine. The ends of the levers 78 and 79, are connected respectively to front and back pairs of toggles 75, 76, and a spring 83 anchored at one end of the machine frame, is connected to an arm 84 on the lever 79, tending to draw the latter to the right and thereby maintain lever 81 against its cam. It will be apparent that, as the lever 81 is engaged by the low side of its cam, the spring 83 draws levers 78, 79, to the right, collapsing the toggles and drawing the blocks 63 downwardly. As the lever strikes the high side of its cam, however, the levers 78, 79, are drawn to the left, straightening out the toggles and elevating the blocks 63. By this motion the table is raised and lowered, blocks 63 sliding in the blocks 64. It will be understood of course that the timing of eccentric 65 and cams 82 is such that the two reciprocating motions alternate. That is to say, the table moves first upwardly, then forwardly, then downwardly and then rearwardly, as indicated by dotted lines a, b, c, d, Fig. 11.

*The packing needles and their operating mechanism (Figs. 6, 7 and 10 to 14)*

The series of fore and aft extending plates 60 serve to provide bearings for a rock shaft 85. Fixed upon this shaft, is a latch arm 86, provided with a tail piece 87, adapted for coaction with the projecting portion 88 of a stationary cam 89, which is bolted or otherwise secured at 90 upon the fixed frame work 31 of the machine, the bolts passing through slots 91 to accommodate for slight adjustment of the cam, and the latter being locked against movement when in adjusted position by a screw 92, working through a flange 93 of the frame work and engaging the flat face 94 of a projection on the cam.

A pair of cross pins 95 and 96 mounted in plates 60 provide pivotal fulcrums for the lower, apertured ends of pairs of sets of parallel links 97 and 98, the upper ends of these sets of links being connected to common horizontal links 99 by the cross pins 100. The horizontal link members 99 are the elements which carry the upwardly projecting packing needles 13.

Coiled contractile springs 101 anchored to the frame member 58 and acting on spring tension adjusting screws 102 carried by brackets 103, fixed to the links 97, normally tend to swing these links to the right from the position of Fig. 11 through an arc, x, shown in dotted lines, toward the position shown in Fig. 10.

The links 97, 98 and 99 are arranged in sets of five at each tunnel, and there are three needles 13 on each link, so that there are fifteen packing needles acting on the wool at the mouth of each tunnel. The spacing of the plates 60 is preferably such as to accommodate one set of links between each adjacent pair of plates. Levers 104, fixed upon the rock shaft 85 carry rollers 105 which engage the links 97 and swing them to the left, through arc y, at times when the rock shaft is rotated in counterclockwise direction by the engagement of the latch tail piece 87, with its associated cam 88.

A spring 106 normally tends to urge the latch to the position of Fig. 10, this spring being anchored to the frame plate 58 at one end and at its opposite end, being connected to a crank arm 107, projecting from a collar 108, fixed on the rock shaft 85.

It will be seen that as the main needle table is shifted rearwardly to the position of Fig. 11, the latch 86 is swung downwardly by the engagement of member 87, with the cam 88, the downward movement of the latch tending to rock the shaft 85, thereby rocking the links 104 and their connected arms 105 in counterclockwise direction to the shaft, the cross bars 105 during this motion, acting to swing the links 97 to approximately the position of Fig. 11 and to tension the actuating springs 101, the tension of which regulates the force with which the packer needles work against the wool when these needles are released after having been elevated to the position of Fig. 10. With the parts in the position of Fig. 11, however, the needles are still below the table and keeper mechanism is provided to engage and retain the latch 86 during the upward movement of the needles into engagement with the wool. Such mechanism is shown in Figs. 10, 11, and 13.

The mechanism for restraining movement of the latch 86 during upward movement of the needles 13 and for subsequently releasing the latch so that the packing needles may be drawn forward by their springs 101, includes a pair of guide members 110, fixed upon a pair of adjacent frame bars 60 and providing a slidable mounting for a keeper bolt 111. The intermediate portion of this bolt is flattened as at 112, and straddled by a bifurcated lever 113, the furcations of the lever being recessed or slotted as at 114, to accommodate a pin or stud 115, extending through the center of the keeper bolt.

That end of the bolt which serves as the keeper is provided with a cam face 116 to be engaged by the latch arm 86 as the latter is rocked with the shaft 85 into depressed position. The fulcrum of the lever 113 is on a cross bar 117 connecting adjacent plates 60 and fixed to rock with the lever is the link 118, the free end of which is pivotally connected to the lower end of a plunger member 119, vertically guided in an apertured angle bracket 120, carried by the frame bar 55. The bifurcated top 121 of the plunger rod, mounts a roller 122, which rides on the rail 123 of a small bracket 124, bolted to the under face of the table 37.

In order to maintain the roller 122, pressed against its track 123, a coiled contractile spring 125, connects one of the bearing pieces 110, with an upstanding pin 126 fixed to the latch bar. The spring acts to draw the latch bar to the right (Fig. 13), thereby rocking the lever 113 to the right and elevating the plunger. As the latch bar 86 is swung downwardly from the position of Fig. 10 to the position of Fig. 11, and engaged under the keeper bolt 111, such bolt is temporarily forced rearwardly by the action of the latch bar on cam surface 116 and the roller 122 is temporarily withdrawn from engagement with the rail 123. But it is immediately snapped back by the spring 125, as soon as the latch bar has reached the position of Fig. 11.

With the parts in the position of Fig. 11, the table 59 and the structure which is rigid therewith, including the frame plates 60, is ready to rise. On the upward movement of the table, it will be apparent that the bracket 120 moves upwardly with respect to the plunger 119, as the result of which the lever 118 is swung downwardly and the lever 113 is swung to the left, withdrawing the keeper bolt so that as the upward movement of the packing needles is completed, the latch 86 is suddenly released, permitting spring 106 to urge the latch to the position of Fig. 10 and carrying cross bar 105 out of the way of members 97. This leaves the springs 101 free to draw the needle carrying bars 99, smartly to the right, the speed and distances which these similarly spring tensioned arms move being determined by the density of the wool with which the needles are engaged.

Each of the five needle carrying bars of a set is independently movable on this spring impelled packing stroke, to the end that needles acting upon the wool of less density can move forward more easily and farther than those acting on the denser wool and the repeated impaling and pushing action thus effected renders the ribbon of substantially uniform density. The elements as well as sum total of possible movement of needles 13 are diagrammed in Fig. 11 by dotted lines $a'$, $b'$, $c'$, $d'$, $x$, $y$, but the actual range of fore and aft, wool-advancing movement of the packer needles ($x$ plus $b'$, Fig. 11) will exceed the advancing movement $b$ of the conveyor needles 14 only to an extent dependent upon the length of the throw of the bar 99 along arc $x$ and this depends on density (resilience) of the measured length of wool previously deposited between adjacent needles 13 and 14 and this in turn will depend on the varying length and the average cross-section times density of each portion of new supply strip that was taken in by the needles 13 on the preceding forward stroke.

The timing of the carrier needle motion with the conveyor needle motion, i. e., the motion of the main needle table is as follows: the conveyor needles and packer needles move downwardly together. As they move to the left together, an added effective translatory motion is imparted to the needle bars 99 through the intermediacy of the actuating members 105, which are controlled by the rock shaft 85. As the parts reach their extreme left hand position, shown in Fig. 11, it will be seen that the packer needles have moved considerably further than the conveyor needles and the packer needles are now latched. The two sets of needles move upwardly together into engagement with the wool, whereupon the latch mechanism which controls the packer needles is released. The latch is smartly retracted by the relatively strong spring 106, thus withdrawing members 105 and leaving the packer needles free to snap forwardly under the action of the springs 101. After needles 13 have completed their spring impelled stroke they are advanced forwardly with conveyor needles 14 (due to the fact that both sets of needles are mounted on the common carrier mechanism) and the ribbon of wool is advanced one step. In other words, that throw of the packer needles which is effected by the springs 101, is entirely an excess throw for the purpose of stringing out the wool variably, according to its density, to make it uniform; and then uniformly compacting it against needles 14. This motion is of course superposed on the further motion of the needles with the table 16, which advance the ribbon through the tunnel.

As before explained, the lag and lead of adjacent independently spring pressed needles causes those engaging denser wool to lag behind, out of lateral registry with neighboring needles engaging less dense portions, and this will permit the denser wool to partly stretch and partly slip laterally out of the path of the needle that is pushing it, so that parts of the denser remnant may lag behind and be operated upon more than once during successive forward movements of the spring pressed needles. Moreover, the so-called needles are preferably thin tapered blades having their front edges vertical. Consequently, every time one of these needles penetrates a dense spot, it splits and stretches it lengthwise of the ribbon, and the swift spring impelled forward movement of the needle applies additional longitudinal stretching and tearing tension. All the movements are relatively short so that the above actions are repeated several times on the same lengths of wool ribbon.

While needles 13 have been properly called "packing needles", this expression necessarily implies that they are "measuring" needles, because their "packing" movement being by spring pressure, they pack a variable length of standard density wool in the space between front needle 13, and rear needle 14 (Fig. 11); and this variably shortened travel of needles 13 along arc $x$, will necessarily "measure" the length of new supply strip that they will engage and feed forward on the next forward stroke. For instance, if the volume and density of a given portion of supply strip happened to be great enough, the needles 13 might press forward only half the arc $x$, in which case the length of new supply strip which they will measure off on the next stroke, will be length of line $b'$ plus only one-half arc $x$, etc. In this connection, it is to be remembered that there is some resistance to forward drag of the supply strip by needles 13, and their forward spring movement being relatively sudden, there will be some stretching of the supply strip in the rear of needles 13; which explains why the supply strip may vary in cross-section times density, from twice to half that required for the final ribbon.

*Darts and their operating mechanism (Figs. 1, 3, 15, and 27 to 30)*

As seen in Figs. 27 to 30, the tear tubes 18 in the bottom of the feed tunnel 37, through which the leading end of the ribbon is carried downwardly by the darts 17, are in vertical alignment with the cylinders 29 in which the bundles of wool thus segregated are deposited. The dart movement therefore, is essentially a straight vertical reciprocating motion and it is controlled by the mechanism illustrated in Fig. 15.

Each cross head 44 is pivotally connected at each end to the upper end of a link 135, and these links in turn are pivotally connected at their lower ends as at 136 to the free ends of levers 137, pivoted upon a common fulcrum rod 138, intermediate their ends. Somewhat above the fulcrum 138, there is provided a second fulcruming shaft 139, upon which are pivoted the upper ends of toggle levers 140, associated toggles 141, pivotally connected as at 142, to the ends of the levers 137, have their ends pivotally connected to the free ends of the levers 140 as at 143. For breaking and straightening the toggles 140, 141, and thereby rocking the levers 137 about their fulcrums 138, to effect vertical reciprocation of the links 135 and the dart carrying cross heads 44 to which they are connected, I provide an eccentric 144 fixed upon the main shaft 32 of the machine. This eccentric is encircled by a ring 145, carrying a bracket 146 which is connected to the aligned toggle levers 140.

In order to accommodate for the different distances of the two sets of links 135, from their controlling eccentric, the two toggle links 141, 141, are of slightly different lengths, as are the two levers 137, 137, which they control. Fig. 15 shows in full lines, the extreme uppermost position of the cross heads and their actuating lever trains and in dotted lines, the extreme lowermost position of these elements.

The darts 17 are preferably formed with tapered lower ends 17a (Figs. 3 and 28) and such ends are provided with a plurality of vertical rows of downwardly and outwardly inclining barbs or needles 148. As the darts move downwardly through collars 48, 49, that part of the ribbon which has been fed forward across the top of tear tube 18, is impaled by the dart on its downward stroke, and is carried with it into said tear tube. The wad of wool is held without slippage around the needles of the dart by being compressed between the dart and the sides of the tear tube 18; and the ribbon of wool is held in tunnel 11 by the closely set end needles 14a (Figs. 4, 27, 28). These needles are not permitted to start their downward withdrawal motion until after the dart has traveled far enough down in the tear tube to pull out or break off the fibers of the impaled wad of wool W, from the ribbon of wool that is held stationary by needles 14a, 14. It will be noted that this free end of the ribbon includes a supported border portion around the unsupported portion that overlies the tube 18. At the left it includes wool shown between the front holding teeth 14a and the tube 18; and at the right it includes an equal length that projects into recess 14x. When the dart engages the center of this area of ribbon, these border portions tend to fold back on the dart, thus contributing to the symmetry of the wad and the firmness with which it fits between the dart and the wall of tube 18.

The torn-off and somewhat compressed wad W is then carried by the dart into the associated cylinder 20. On the up strokes of the darts, the wad is stripped from the dart by the stripper needles 21, which work through the cylinder walls. As the dart rises, the forward motion of the needles 14 causes the ribbon to partly cover the top of tube 18 before the dart has had time to completely pass up out of collar 48, 49; and tendency of this wool to be carried up by the dart is corrected by providing the stationary stripper needles 150, which project radially inwardly from the collar 48. It will be understood, of course, that the rows of impaling needles on the darts are out of registration with the two sets of stripper needles 21 and 150 to the end that there will be no interference between these sets of needles. For a similar reason, the darts are firmly held in the cross heads, 44, against rotation or twisting during their vertical reciprocation.

*Wad guides and plungers (Figs. 16 and 35)*

Before discussing the details of the mechanism which actuates the forming plungers, the folding dies and the stripper fingers, reference may be had to Fig. 35 for a better understanding of the general arrangement of the individual cylinders with their associated plungers. There are two rows of wad receiving cylinders arranged one behind the other and with the cylinders of each row staggered with respect to the cylinders of the opposite row. In the illustrated embodiment of the machine, there are five in the front row and four in the rear row, although it will be apparent that any desired number of cylinders might be utilized and the cylinders may all be arranged in the line if desired. Tie rods 400 may be used to brace and rigidly connect the cylinders. The particular arrangement herein illustrated, is conducive to compactness of the machine. The plan view of the conveyor needle table (Fig. 4) shows that the movable conveyor needle plates that serve the rearmost cylinders, are correspondingly shorter than those which serve the front cylinders, although all of the tunnel entrances are in the same line. This difference in length is unimportant because the only function that these table plates 59 and their needles 14 perform is purely a conveying function. The problem of homogenizing the wool and packing it into the tunnels in uniformly dense ribbons is taken care of entirely by the packer needles.

While I have referred consistently to the members 20 as cylinders, they are in fact, in the present instance, of rectangular cross section and I intend to use the word "cylinder" as covering any hollow piston or plunger guiding chamber of any cross sectional shape. Within each cylinder 20, is arranged the correspondingly shaped vertically reciprocatory piston 19, to the bottom of which is connected piston rod 160, this rod in turn carrying at its lower end a guide block 161, which is adapted to be connected to the piston or plunger operating mechanism illustrated in Fig. 16.

The lower ends of the cylinders 20 are slotted as at 162 so that each row of guide blocks 161 may be connected to a common cross shaft 163 or 164, as the case may be, which extends longitudinally of the machine and works in the slotted lower ends of the cylinders. Each cross bar or cross rod 163 or 164 serves in effect as a cross head to manipulate its particular row of plunger members 19.

The ends of the shafts 163, 164 are pivotally connected to the lower ends of links 165, 166. These links in turn are connected at their upper ends to the free ends of levers 167, 168, the latter being fulcrumed upon a common shaft 138 mounted toward the rear of the machine. The up and down movement of the levers 167 and 168 to effect the reciprocation of the plungers 19, is controlled by an eccentric 170 mounted upon the main shaft 32 of the machine and encircled by an eccentric ring 171 carrying a bracket 172 which is pivotally connected as at 173 to the intermediate portion of a lever 174 fulcrumed upon a suitable shaft 139. The free end of the lever 174 is connected by a pair of links 176, 177 to the levers 167 and 168 respectively.

The levers 167, 168 and the links 176, 177 are relatively heavy and normally act by gravity through the links 165 and 166 to depress the cross shafts 163, 164 and maintain all of the plungers 19 in their lowermost or retracted position. When the high side of the eccentric 170 is in a position to elevate the lever 174, however, the levers 167, 168 are lifted to the position illustrated in Fig. 16, thereby raising the plungers 19 and forcing them upwardly to compress a wad of wool against the forming dies which I shall now describe.

The forming dies and their operating mechanism
(Figs. 1, 17, 18, 27–30, and 35)

The die mechanism which descends upon the top of the cylinders 20 and serves as a stationary plate or anvil against which the wool wads are thrust by the plungers are shown in side elevation in Figs. 17, 18, 27 and 28. These dies may be observed substantially in front elevation in the perspective view (Fig. 1) and are shown in top plan view in Fig. 35. This latter figure may be first referred to in order to understand the interrelation of the operating mechanism for all of the various dies.

The cylinders of the front row are provided at their tops with forwardly offset upstanding sleeves 180, adapted to receive short pivot pins 181 upon the ends of which are mounted extended apertured ears 182 integral with the substantially flat die plates 22 which have the apertures 24 therein. At their forward ends, these plates are provided with ears 183, registering with corresponding ears 184 of the upper folding die plates 23. The ears 183 and 184 of all of the sets of plates 23 and 22 of the front row of dies, are pivoted together upon a common longitudinally extending pivot rod or shaft 185. The plates 22 of the rear set of molds are similarly pivotally connected to their associated cylinders and to their associated mold plates 23 and again the plates 22 and 23 are connected by a common longitudinally extending pivot shaft 186.

Connecting the forward set of die plates 23 to the rear set thereof, are a plurality of substantially horizontal connecting links 187. The rear set of plates 23 are provided with apertured ears 188 and a common, longitudinally extending pivot shaft 189 connects all of these ears to the rear ends of the links 187. The forward ends of the links 187 are all connected by a longitudinally extending pivot shaft 190 to corresponding ears 188 on the forward set of plates 23. Thus the shafts 185, 186 and 189, 190 constitute the movable pivots of the collapsible die plate structure. The fixed pivots of such structure in the case of each set of dies being between the apertured plates 22 and the cylinder tops.

For actuating the molds to swing them from the open position of Fig. 18 to the closed position of Fig. 17, I provide a special arrangement of leverage and linkage which may be duplicated if desired and connected to one or more of the links 187. This mechanism (Figs. 17 and 18) includes a cam 191 mounted on the main shaft 32 of the machine and actuating a lever 192, fulcrumed on a suitable cross shaft 139. The lever carries a roller 194 which is maintained constantly in contact with the surface of the cam 191 by a special mechanism which I shall later describe. At the free end of the lever 192, the latter is connected as at 195 to the upper end of a link 196, the lower end of the latter being pivotally connected as at 197 to the intermediate portion of a lever 198, fulcrumed at one end on cross shaft 138. The free end of the lever 198 is pivoted as at 200 to one end of a short link 201, the opposite end of which is pivoted as at 202 to one of the horizontal links 187.

The two extreme positions of the dies and their operating structure appear in Figs. 17 and 18 and in understanding the manner in which the movement of the lever 192 from the position of Fig. 17 to that of Fig. 18 has effected opening of the dies, it must be remembered that there are four movable pivots 195, 197, 200 and 202, involved in the actuating lever train as well as the four additional movable pivots 185 and 186, and 189 and 190 embodied in the folding die mechanism itself. As the free end of the lever 192 moves upwardly, link 196 will be drawn upwardly but since the lower end of this link is connected to the lever 198, upward movement of the lever 198 swings the lower end of the link to the left as shown in Fig. 18. Simultaneously, the upward and rearward movement of the pivot 200 acts upon the link 201 to lift the series of links 187. However, the links 187 are constrained against movement to the left because they are pivoted at 185, 186 on frame molds 22, 22, which are pivoted on fixed pivots 181, thus constraining links 187 to oscillatory movement about these centers. As the upward motion of the lever 193 continues and the pivot 200 passes beyond the dead center defined by the pivots 197 and 190 the levers 198 and the link 201 begin to function as a toggle and when this toggle is fully straightened out, the parts are in the position of Fig. 18. The parts reach this position just as the roller 194 has reached the high point of its cam.

Inasmuch as the movement of the folding die plates must be timed with great nicety, so that they will escape the darts and so that they may latch at the correct time, and so they may properly cooperate with the pad ejector mechanism and the plungers, it is important that the lever 192 have its roller 194 maintained in continuous contact with the perimeter of the very accurately formed cam 191. To this end, I have provided special mechanism acting continuously to maintain a downward tension on the lever 192 and hold it against the cam.

Referring particularly to Figs. 26 and 26a it will be observed that a skeleton form of shoe 205 encircles the shaft 139. The shoe 205 is normally spring pressed forwardly into camming engagement with the roller 206 on the lever 192. Camming engagement between the shoe and the roller tends to maintain the lever 192 depressed against its cam 191, and in order to prevent upward swinging movement of the shoe 205 about the shaft 139 as a pivot, a special ramp 207 is mounted on the frame work of the machine and through suitable anti-friction devices interposed between the cam and the free end of the shoe, the latter is always held in a position where it tends to depress the lever 192.

The shoe, indicated generally at 205 includes a stirrup portion 208 which encircles the shaft 139 and is of a curvature to substantially snugly embrace this shaft and a cam portion 209 which coacts with the roller 206 and with the ramp 207. Means is provided for normally holding the curved end 208a of the stirrup portion against the shaft 139. Such means in the present instance comprises a block or saddle 210 sliding between the straight side portions of the stirrup 208 and having a concave face 211, embracing the shaft 139. The member 210 serves as a reactance piece for a plurality of coiled expansion springs 212, which encircle stud members 213, the latter having threaded reduced extensions 214 screwing into the member 210. Springs 212 react against the saddle piece 210, bear at their forward ends against the straight wall 215 of the slot in which the springs are accommodated and thereby tend to move the shoe in its entirety to a position where the curved portion 208a of the stirrup is held against the shaft.

The cam portion 209 of the shoe is provided at its forward lower corner with a cam surface 216 which inclines upwardly and forwardly and is provided with two slight depressions 217 and 218, which engage the roller 206 in the two extreme positions of the lever 192. The means for maintaining a continuous anti-friction contact between the ramp 207 and the shoe 205, may include a pair of plates 219, disposed on opposite sides of the vertically aligned ramp and shoe and carrying journals 220 for the anti-friction rollers 221 which are disposed between the shoe and the ramp. It will be obvious that the forward motion of the shoe against the roller 206 tends to elevate the forward end of the shoe to an extent limited by its engagement with the anti-friction rollers 221. In order to prevent loss of the plates 219, and to limit displacement thereof, with respect to the shoe 209, the lower portions of these plates are connected by a cross pin 222 working in a slot 223 in the shoe near the upper forward corner thereof.

In Fig. 26, the lever 192 has been positively moved to its elevated position by its associated cam 191. During this movement the roller 206 has traveled up the cam surface 216 and forced the shoe 205 rearwardly against the action of the springs 212. Rocking movement of the shoe about the shaft 139 has been prevented, however, by the engagement of the rollers 221 with the ramp 207. In this position, it will be apparent that the springs are still tending, through the medium of the cam face 218 and the roller 206, to depress the lever 192. As the cam 191 continues to rotate and gradually presents its low side to the roller 194, it will be apparent that the springs 212 will urge the shoe 205 forwardly and the cam surface 216 will act upon the roller 206 to aid the force of gravity in depressing the lever 192 and holding it firmly against the cam. Thus in all positions, the shoe 205 is effective to assist the action of gravity in maintaining the lever 192 against its cam. This arrangement is particularly desirable in this connection because the lever train 192, 196, 198, etc., while highly effective for actuating the hinged die structures, is not particularly well suited for applying its weight effectively to aid in the depression of the lever 192.

*The die latching mechanism (Figs. 19 and 20)*

Means is preferably provided for latching the folding die members in their closed position so that they are securely sustained against the upward thrust of the wad compacting plungers. Such latch mechanism which may be of very simple construction, includes a pair of rock shafts 220, and 221, extending longitudinally of the machine and having bearings in the respective sets of cylinders.

At intervals along shaft 220, there are affixed hook shaped latches 222 and staggered with respect to the latches 222, similar latches 223 are arranged on the rear shaft 221. As the shafts 221 and 220 are simultaneously rocked, the latch members 222 and 223 are adapted to move into engagement with the longitudinally extending cross rods 189 and 190 respectively thereby locking the entire folding die structure against upward movement during the brief period when the plungers ram the wool into engagement with the dies.

The operating mechanism for the latches may include a cam 224 fixed on the main shaft 32 and engaging a roller 225, carried by the intermediate portion of the lever 226 mounted on shaft 139 and having its roller drawn against the cam by a suitable spring 228. The free end of this lever is pivotally connected to the upper end of a link 229, the lower end of which is pivotally connected as at 230 to the intermediate portion of a lever 231, pivoted as at 232 on the cylinder frame. The free end of the lever 231 has a pivotal connection 233 with the lower end of a link 234, the latter at its upper end, being pivotally connected as at 235 to a crank arm 236, fixed to the rear rock shaft 221.

The means for connecting the rock shafts 220 and 221 to synchronize movement thereof, consists simply of a pair of crank arms 237 and 238 fixed upon the shafts 221 and 220 respectively, and having their free ends pivotally connected to opposite ends of a link 239. Thus the parallel linkage 237, 239 and 238, insures simultaneous rocking movement between the shafts 221 and 220 and simultaneous engagement of the sets of hooks 222, 223 with their respective shafts 189 and 190.

*Pad ejector mechanism (Fig. 21)*

After the die structures have been opened, the formed pads will remain in the apertures 24 of the plates 22 in the absence of some means to positively eject them into the trough 26. The ejector fingers 25 are therefore provided. There are two sets of these fingers fixed respectively to a pair of longitudinally extending rock shafts 240 and 241 associated with the front and the rear set of die mechanism.

The means for simultaneously rocking the shafts 240 and 241 to swing the fingers to the wad ejecting position of Fig. 29, consists of a lever 242 fulcrumed on a shaft 138 and carrying intermediate its ends, a roller 244 engaged with a cam 245 on the main shaft 32, of the machine. The upper free end of the lever 244 is connected by link 246 to one end of a crank plate 247, fixed upon the shaft 241. A corresponding crank arm 248 is fixed upon the rock shaft 240. The free end of the crank plate 248 and that end of the crank arm 247, which is unconnected to the link 246 are respectively pivotally connected as at 249, 250, to the link 251, whereby upon rocking of the plate 247, the two rock shafts 240 and 241 are caused to rock in unison.

The means for maintaining the lever 242 against its cam, is illustrated as a tension spring 252, anchored at any suitable point in the frame work and having its free end connected to a crank arm 253, fixed to the rock shaft 240. As the spring 252 tends to draw the crank arm downwardly, it acts through the arm 253 to throw the link 251 to the left, rotating the crank plate 248 in counterclockwise direction and through the link 246, drawing the roller 244 against the cam 245.

As the shafts 240 and 241 are rocked in counterclockwise direction, the ejector members 25 which they carry, are swung to the position of Fig. 29, ejecting the formed wads into the chute 26. As the crank arms 240, 241 are swung in clockwise direction, the hook shaped ejectors are moved approximately to the position of Fig. 30, where they are clear of the collapsible die structure. These ejector members are preferably bifurcated or have their intermediate portions offset to permit the free passage of the darts 17 downwardly.

*Stripper needles and operating mechanism, (Figs. 22, 23, 24, and 34)*

Each cylinder 20 has associated therewith a set of four stripper needles which work through the respective front, rear and side walls of the cylinders. These stripper needles have heretofore been referred to generally by the reference character 21, but for convenience of description of the stripper needle mounting means and actuating means, all of the needles which work through the forward walls of the cylinders are numbered 21a, and those which work through the rear walls of the cylinders are numbered 21b, and the two needles which work through the sides of the cylinders, are numbered respectively 21c and 21d.

Mounted in the frame castings 260, which are integral with the front set of cylinders 20 and extending longitudinally of the machine respectively in front of and behind said cylinders, are a pair of rock shafts 261 and 262. A corresponding pair of rock shafts 263 and 264 are associated with the rear set or row of cylinders 20. The shafts 261 and 263 carry at properly spaced intervals, upstanding crank arms 265, carrying the stripper needles 21a of the front and rear row of cylinders respectively. Shafts 262 and 264 are provided with corresponding crank arms 266 carrying at their free ends, the needles 21b of the front and rear row of cylinders.

The casting plates of the cylinders 20 are provided with suitable bearing members 267 in which are rotatably mounted the ends of rock shafts 268 and 269, said rock shafts extending transversely in the machine and mounting respectively, crank arms 270 and 271 in the free ends of which the needles 21c and 21d are fixed.

Thus all of the stripper needles are carried by crank arms fixed to rock shafts and the problem of moving the needles into and out of the cylinders resolves itself into a problem of correctly, simultaneously rocking all of the shafts 261, 262, 263, 264, 268 and 269, in a proper direction to effect the desired projection or retraction of the needles which they carry.

While many expedients might be resorted to for the purpose of effecting the desired simultaneous rocking of these shafts, I have shown one comparatively simple form of mechanism for accomplishing the desired result.

A lever 272 fulcrumed at one end of a shaft 139 carries intermediate its ends a roller 274, travelling upon the surface of a cam 275, fixed to the main shaft 32. The free end of this lever is pivotally connected as at 276 to the upper end of a pull link 277, the latter in turn being pivotally connected as at 278 to one end of a rocker plate 279 having a suitable hub 280, journalled on the shaft 281. The opposite end of the rocker plate 279 is in turn pivotally connected as at 282 to the lower end of a link 283, which in turn at its upper end, is pivotally connected as at 284 to one end of a crank plate 285, the latter being fixed intermediate its ends on the shaft 264.

Thus, as the cam 275 elevates the lever 272, link 277 will be drawn upwardly, link 283 will be drawn downwardly and through the crank plate 285, rock shaft 264 will be slightly turned in a counterclockwise direction, tending to withdraw the needles 21b from their associated cylinders.

The means for simultaneously rocking the shaft 263 in a clockwise direction consists of a connection between this shaft and the crank plate 285. Such connection includes a crank arm 286 fixed to the rock shaft 263 and at its free end connected by a link 287, to that end of the crank plate 285 opposite the pivot 284. The pivotal connection 288 between link 287 and crank plate 285 is at the same distance from the shaft 264 as is the pivot 284 whereby the desired simultaneous rocking of the shafts 263 and 264 is accomplished.

Shafts 262 and 261 are likewise rocked from the shaft 264. To accomplish this result, a pair of similar crank arms 289 and 290, depend from the shafts 262 and 264 respectively and at their lower ends are pivotally connected to a horizontal link 291. Thus as shaft 264 is rocked counterclockwise, the linkage 289, 291 and 290 will effect counterclockwise rotation of the shaft 262.

Shaft 261 is connected to the shaft 262 to rock simultaneously therewith but in the opposite direction. The connection between these shafts includes crank arms 292 and 293, fixed to the shafts 262 and 261 respectively and connected by a link 294.

Preferably the crank plate 279 also is effective to rock the short rock shafts 268 and 269 in synchronism with the elongated rock shafts 261, 262, 263 and 264. With this in view, the fulcrum pin 282 of the crank plate 279 not only connects this plate to the link 283 but also connects it to a second link 295, the upper end of which is pivotally connected as at 296 to the end of a lever 297, having its intermediate portion fixed to one of the shafts 268. As the particular shaft 268 which carries the lever 297, is rocked in counterclockwise direction (see Fig. 24) means is provided for rocking the associated shaft 269 in clockwise direction, such means being illustrated as a crank arm 300, fixed to the shaft 269 and pivotally connected to the free end of the lever 297 by a link 301. Having thus arranged to effect the desired rocking movement of one pair of the shafts 268, 269, as will be apparent from Figs. 24 and 34, means is provided for causing these shafts to simultaneously rock all of their fellows in unison.

The mechanism used for this purpose includes a plurality of crank arms 302, extending downwardly from the rear ends of the front set of rock shafts 269, and a plurality of similar crank arms, extending downwardly from the forward end of the rear set of shafts 269. The free ends of all of these crank arms are connected to a bar 304 which is actuated by the movement of the arm 300 to which the link 301 is attached.

Correspondingly the rear ends of the front set of shafts 268 carry upwardly extending crank arms 305 and the front ends of the rear set of shafts 268 carry upwardly extending crank arms, all of which are connected to a lower bar 307, arranged under the bar 304, and actuated by the crank arm 305 on that shaft 268 which mounts the crank plate or lever 297.

Timing (Figs. 27 to 30)

While the operation of the machine will have become more or less self-evident from the foregoing, reference may be had to these figures for a fuller understanding of the timing of the movement of the various instrumentalities which act upon the wool.

In the first position (Fig. 27), the plunger 19 has risen to the top of its stroke under the influence of its cam 170, compressing one wad of wool into the pad shape determined by the opening in the forming die 22, the folding die members 22 and 23 being at this time, closed and latched. The opening in the plate 22 is of the same cross sectional shape and area as the plunger so there will be no loose ends of fibre left in the cylinder and all of the previously deposited wad will be jammed into the die opening by the plunger. At this time, the ejector 25 is in its elevated position and the dart 17 is disposed above the end of its associated tunnel. An advancing step of the ribbon has just been completed by the action of the spring packing needles 13 and the conveyor needles 14 so that the channel above the opening 18 is filled with the wool. In this view, also, it will be noted that the stripper fingers are withdrawn from the cylinders in order to provide free passage for the plunger member 19.

In Fig. 28, the next position of the parts is shown. In this position, the hinged die sections 22 and 23 have been swung open and out of the path of the dart which has descended through the opening 18 carrying with it the new wad of wool which it has impaled. The plunger has withdrawn below the stripper fingers and the ejector is starting on its downward stroke to eject the previously formed pad, which is now carried by the walls of the opening 24. The needle table having completed its forward feeding stroke, is just beginning to descend and withdraw the needles from the ribbon of wool within the tunnel.

Fig. 29 shows the position of the parts an instant later after the wad of wool has been carried by the dart below the stripper fingers. At this time, the needle table has reached the end of its downward movement as has the ejector member, which has kicked the previously formed wad out of the die. The plunger 19 is further retracted and the stripper fingers are still inoperative.

Fig. 30 shows the position of the parts after the dart has partially completed its upward stroke. By this time, the ejector member has been restored to its normal position, the needle table has been fully retracted, the stripper fingers have moved inwardly to strip the wad of wool from the dart. Between the position shown in Fig. 30 and that shown in Fig. 27, the needle table will have again been elevated and actuated in its forward feeding movement, the dart will have been fully withdrawn, the stripper needles will have withdrawn and the folding die structure will have been moved into place and latched, and the plunger brought up to form a new pad. The side elevational view of Fig. 2 shows the relation of the various controlling cams which effect the desired timing of the various elements of the mechanism.

The term "metal wool" is used in the present application merely for the sake of descriptive convenience and I have no intention of limiting myself to fibrous metallic shavings. The term is intended to include any and all generally analogous substances regardless of whether they are considered inferior or superior to metal wool for cleaning and abrading purposes. Typical of such materials are finely drawn, rolled or extruded metal wires or strands which are capable of handling much in the same fashion as shaved metal wool.

As explained above, the words "packing", "packer", or the like are used in the specification to identify the spring pressed needles 13; and it is to be understood that in the claims these words are intended to imply the wool "measuring" as well as the wool "packing" function.

I claim:

1. In a machine of the class described, means for engaging and advancing a ribbon of metal wool, means for tearing wads of wool from the leading end of the ribbon including means for supporting and holding the ribbon adjacent where the tearing is to be localized; and a wool engaging member moving transversely adjacent the end of the support to break and tear off the end of the ribbon transversely and means for shaping the wads after such separation.

2. In a machine of the class described, means for advancing an elongated mass of metal wool, a dart reciprocable across the path of movement of the elongated mass in a direction substantially perpendicular to said path for tearing wads of wool from the mass, means for supporting and holding said mass of steel wool at points adjacent to the path of the dart, and a molding mechanism into which the dart carries the wads, said molding mechanism including stripper means for freeing the wad from the dart and means for forming the wad into desired shape.

3. In a machine of the class described, a pad forming chamber having a movable recessed wall structure, means operating to carry a wad of metal wool into said chamber when the movable wall structure is open, means for pressing it into the recess of said wall structure when the latter is closed, means to strip the wad from the carrying means during the withdrawal of the latter and means to eject the formed pad from said recess when the movable wall structure is in open position.

4. In apparatus of the class described, a cylinder and a piston therein, means including a carrier moving a wad of metal wool on said carrier into the cylinder through one end thereof and then withdrawing the carrier, means for stripping the wad from the carrier while in the cylinder, a die serving as a cylinder head and having at its inner face a forming chamber to receive said wad, means moving the die to close the cylinder end after withdrawal of the carrier and to open the cylinder end before entrance of the carrier with another wad, and means drawing said piston back into said cylinder to permit entrance of said carrier and advancing said piston after withdrawal of said carrier and closing of the cylinder end by the die to press the wad into the die to form the wad and enable the withdrawal thereof with the die.

5. In an apparatus of the class described, a cylinder and a piston therein, a die structure movable to close the top of the cylinder and cooperatively with said piston to form a shaping chamber for a mass of metal wool, a means including a carrier for moving a wad of wool into the cylinder while the die is removed from said top, means for stripping the wool from the carrier as the latter is withdrawn, the die structure including a member having an aperture therethrough determining the peripheral shape of the pad and frictionally holding the same and a closure member to close the outer end of said aperture when the die structure is in position to close the top of the cylinder, means for moving the apertured member against the top of said cylinder and the closure member across the outer end of the aperture and withdrawing the apertured member from the top of the cylinder and the closure member from the outer end of the aperture, and means ejecting the pads from the apertured chamber when the closure member is in open position.

6. In a machine of the class described, means whereby a ribbon of metal wool is engaged and is intermittently advanced uniform distances to expose uniform lengths of free ribbon at the leading end thereof, and means whereby the successive free ends are transversely torn off as approximately similar wads, said means including ribbon supporting and holding means having a forward transverse edge beyond which said leading end is projected, means for releasably supporting said free end and a cooperating member movable transversely toward and into engagement with the free end of the ribbon adjacent said transverse edge of the support and beyond the same, to grip and transversely tear off said free end.

7. In a machine of the class described, a tunnel having a transverse passage therethrough, means to advance a ribbon of metal wool through the tunnel to place the leading end of said ribbon in said transverse passage, means for tearing wads of wool from the leading end of the ribbon, such tearing means including means for supporting and holding the ribbon adjacent said passage where the tearing is to be localized and wool-engaging and holding means acting through said passage to tear from the ribbon the part extending into said passage.

8. In a machine of the class described, a tunnel having at opposite sides, openings providing a transverse passage through the tunnel, means for advancing an elongated mass of metal wool through the tunnel to present the leading end of the elongated mass at one of said openings serving as an outlet, means for tearing wads of wool from the leading end of said mass, such tearing means including means for supporting and holding the ribbon adjacent said outlet where the tearing is to be localized and a barbed dart reciprocable through the passage to engage and hold said leading end, to break and tear off the leading end transversely and carry the leading end in the form of a wad, out of the tunnel through said outlet, stripper mechanism for removing the wad from said dart and means adjacent the opening opposite said outlet to prevent wool from being carried out of the tunnel by the dart during its return movement.

9. In a machine of the class described, means predetermining a path for the travel of an elongated mat or mass of metal wool, means movable in a plane at right angles to the path of travel of the mass, for displacing and segregating the leading end of the mass, said means including a barbed dart engaging the end of the mass and tearing a wad of wool therefrom, means for supporting and holding the leading end of the mass to enable tearing to be effected at a definite position, means for advancing the mass step by step along its predetermined path and for reciprocating the dart in timed relationship, whereby a new body of material is presented for engagement at each reciprocation of the dart, means for stripping the wad thus separated, from the dart, and means for thereafter shaping the stripped wad.

10. In apparatus of the class described, a cylinder and a piston therein, a hinged cylinder top adapted to coact with the piston in molding a mass of fibrous material, means including a reciprocating barbed dart to carry a mass of material into the cylinder, and means including stripper fingers movable through the cylinder wall to remove said material from the dart.

11. In apparatus of the class described, a cylinder and a piston therein, a hinged cylinder top constituting a mold adapted to coact with the piston in molding a mass of fibrous material, a barbed dart adapted to carry a mass of material into the cylinder, stripper fingers movable through the cylinder wall to remove said material from the dart; means for actuating the piston, the dart, the stripper fingers and the hinged mold in timed relationship, whereby the mold is opened and the piston and stripper fingers retracted, when the dart enters the cylinder.

12. In a machine of the class described, an open topped cylinder and an upwardly facing plunger therein; means to deposit a wad of metal wool in said chamber, a die structure including an apertured plate and a backing therefor to be swung into position over the top of the cylinder and to act with said piston in forming a pad from the wool wad in the cylinder.

13. In a machine of the class described, an open topped barrel and an upwardly facing plunger therein, means to deposit a wad of metal wool in said barrel, a folding die structure including an apertured plate and a backing therefor to be swung into position over the top of the barrel and to act with said piston in forming a pad from the wool wad in the barrel; means for opening the folding die structure and for ejecting the finished pad from the opening in which it is formed; and means for operating the wad depositing means and the plunger and die structure operating means in timed relationship to each other.

14. In a machine of the class described, a mold structure including a receiving tube having an upwardly facing piston therein, a foldable die to move downwardly upon the top of the tube and coact with said piston in molding a mass of fibrous material deposited over the piston, a barbed dart for carrying a fibrous wad into the tube, stripper fingers working through the tube walls to remove the wad from the dart, means for synchronizing the movement of the stripper fingers, the piston, the dart and the folding die structure.

15. In a machine of the class described, a mold structure including a receiving tube having an upwardly facing piston therein, a die to move downwardly upon the top of the tube and coact with said piston in molding a mass of fibrous material deposited over the piston, the die structure including a hinged plate having an aperture corresponding to the cross sectional area of the tube and a backing plate for said apertured plate, means for operating said piston to admit into the tube a mass of material to be molded and to press the material into said die when the latter closes the top of the tube, and means for moving the die away from said upper end of the tube to admit material to the tube and shifting the backing plate to open position to enable molded material to be removed from said aperture and for closing the aperture with the movable plate and returning the die to tube-closing position.

16. In a machine of the class described, a mold structure including a receiving tube having an upwardly facing piston therein, a foldable die to move downwardly upon the top of the tube and coact with said piston in molding a mass of fibrous material deposited on the piston, the folding die structure including a hinged plate having an aperture corresponding to the cross sectional area of the tube and a backing plate for said apertured plate, the apertured plate serving to frictionally retain the molded wad as the die structure is swung to open position, an ejector member and means for moving the latter to kick the molded wad out of the aperture, and means for so timing the movement of the dart, the plunger, the ejector, and the folding die structure that they operate synchronously in non-interfering relationship.

17. Apparatus for pressing wads of metal wool into pads of substantially uniform size, including a receiving tube and a plunger therein, a folding die structure including a plate hinged to the top of the tube and having an aperture therein of size and shape corresponding to the tube, a second plate hinged to the free edge of the apertured plate and serving as a backing member therefor, whereby the shape of the wad of wool forced upwardly by the plunger is predetermined by the shape of the aperture and the amount of pressure applied.

18. Apparatus for pressing wads of metal wool into pads of substantially uniform size, including a receiving tube and a plunger therein, a folding structure including a plate hinged to the top of the tube and having an aperture therein of size and shape corresponding to the tube, a second die plate hinged to the free edge of the apertured plate and serving as a backing member therefor, whereby the shape of the wad of wool forced upwardly by the plunger is predetermined by the shape of the aperture, and means to deposit a wad of wool in the tube.

19. Apparatus for pressing wads of metal wool into pads of substantially uniform size, including a receiving tube and a plunger therein, a folding structure including a plate hinged to the top of the tube and having an aperture therein of size and shape corresponding to the tube, a second die plate hinged to the free edge of the apertured plate and serving as a backing member therefor, whereby the shape of the wad of wool forced upwardly by the plunger is predetermined by the shape of the aperture, means to deposit a wad of wool in the tube, and means to subsequently fold the die structure to closed position.

20. Apparatus for pressing wads of metal wool into pads of substantially uniform size, including a receiving tube and a plunger therein, a folding die structure including a plate hinged to the top of the tube and having an aperture therein of size and shape corresponding to the tube, a second die plate hinged to the free edge of the apertured plate and serving as a backing member therefor, whereby the shape of the wad of wool forced upwardly by the plunger is predetermined by the shape of the aperture and the thickness of the apertured plate, means for latching the die structure against opening during the wool packing movement of the plunger.

21. Apparatus for pressing wads of metal wool into pads of substantially uniform size, including a receiving tube and a plunger therein, a folding die structure including a plate hinged to the top of the tube and having an aperture therein of size and shape corresponding to the tube, a second die plate hinged to the free edge of the apertured plate and serving as a backing member therefor, whereby the shape of the wad of wool forced upwardly by the plunger is predetermined by the shape of the aperture and the thickness of the apertured plate, the aperture serving to frictionally retain the shaped pad as the die structure is swung to open position, and a kicker mechanism for ejecting the wad from the aperture prior to the next closing of the die structure.

22. In a machine of the class described, means to deliver a crudely formed ribbon of metal wool of non-uniform density and means acting on said ribbon to render both its density and its cross-section substantially uniform, said means including means penetrating the body of the ribbon at a multiplicity of points, to move adjacent fibers apart lengthwise of the ribbon.

23. Mechanism for operating upon crudely formed ribbon of metal wool to render its density more uniform, including means feeding a ribbon at a definite predetermined rate of speed and enclosing the same to determine the maximum cross section, and packing means behind the feeding and enclosing means, said packing means including means for yieldably applying a predetermined pressure to advance the ribbon through a predetermined distance in the direction of feed of the feeding means, whereby the packing movement is retarded as the counterpressure from said feeding means approaches the predetermined pressure and the length of said packing movement is shortened as the counterpressure equals said predetermined pressure.

24. Mechanism for operating upon a crudely formed ribbon of metal wool to render its density substantially uniform, including a passage through which the wool is conveyed; means feeding the wool through said passage at a definite predetermined rate of speed, packing means adjacent the intake of said passage to act on said ribbon in advance of said feeding means, said packing means including means to engage the wool, feed it forward, release it and return for another feed; and means adapted to operate said packing means at a faster feed rate than said feed means to compact the wool.

25. In a machine for operating on a crudely formed ribbon of metal wool, a tunnel, means for feeding metal wool into the tunnel, and means advancing the wool through the tunnel to form a ribbon and rendering it more uniform in density, such advancing means including two successive sets of conveyor needles, a forward set advancing the ribbon at a definite predetermined rate and the rear set operating at a faster rate to pack the material into said tunnel and form a compact ribbon.

26. A machine for imparting uniform density to a ribbon of metal wool comprising a passageway of predetermined cross section through which the wool is to be fed, a needle table, means for imparting a four-way, rectilinear motion to the table to effect step by step advance of the ribbon, a set of needles rigidly mounted on and carried by the table, a set of needles carried by the table at the intake end of the passageway, said sets of needles working through a wall to advance the wool, the former set moving with the speed of the table, and means for giving the latter set of needles a longer movement in the throw than that produced by the table.

27. In a machine of the class described, a passageway of substantially regular cross-sectional shape, means for feeding a crudely formed ribbon of metal wool of non-uniform density and for rendering the wool more uniform in density while feeding all of it in and through said passageway, said means including at least two successively operating sets of needles, means for operating the second set to feed at a definite desired rate the ribbon delivered to it by the first set, means for operating the first set to feed the entering non-uniform portion of the ribbon through a greater distance and at a higher rate of speed than the second set, the operating means for said first set including spring-tensioning means individual to the needles of the first set to apply uniform pressures to feed the wool forward to the succeeding set a variable distance according as the wool engaged thereby is more dense or less dense.

28. In a machine of the class described, a passageway of substantially regular cross-sectional shape, means for feeding a crudely formed ribbon of metal wool of non-uniform density and for rendering the wool more uniform in density while feeding all of it in and through said passageway, said means including at least two successively operating sets of needles of which the first set are packing needles adapted to penetrate and feed forward the non-uniform ribbon and a succeeding set are conveyor needles adapted to penetrate and feed forward the ribbon, means for operating the conveyor needles and packing needles with a four-way action to enter the wool at a predetermined point, advance the wool, withdraw from the wool and reenter it at said first mentioned point, and means for further operating the packer needles with individual spring-impelled movements while the conveyor needles are at the beginning of the feed stroke and in engagement with the ribbon to apply uniform pressure to feed the wool, variable distances according to its density.

29. In a machine for imparting a uniform density to a crudely formed ribbon of metal wool, a passageway of substantially regular cross-sectional shape, and means for feeding the ribbon to and through said passageway and rendering the ribbon of substantially uniform density, said means including a plurality of packing needles, means for moving the packing needles into and out of engagement with the ribbon, and springs acting individually on different needles to impel them into the direction of movement of the ribbon to advance and compact the wool, and means acting on the ribbon after passing the packing needles to restrain the movement of the ribbon and enable compacting of the wool by the spring-impelled packing needles.

30. In a machine of the class described, means for rendering uniform the density of a ribbon of metal wool, while advancing the latter, said means including a passageway of substantially uniform cross-sectional area and a plurality of needles perpendicular to said ribbon and arranged at intervals across the same, springs individual to said needles urging them in a wool compacting and advancing direction, and needle controlling means retracting the needles and tensioning the springs projecting the needles into the ribbon, releasing the needles to the action of the springs, retracting the needles and again tensioning the springs, and means to retard the feed of the ribbon as influenced by the needles to enable the same to compact the wool.

31. In a machine for operating upon crudely formed ribbon of metal wool, a passageway of substantially uniform cross sectional shape, means for conveying such ribbon through the passageway, and means cooperating with the conveying means for rendering the ribbon substantially uniform in density while advancing it into the passageway, the means for rendering the wool of uniform density including a plurality of needles engageable with the crudely formed ribbon, and means including springs acting on the needles to yieldingly urge them forwardly while maintaining them upright and cause them to compact the wool, said needles being laterally flattened to present thin edges in the direction of feed of the wool, said conveying means retarding the feed of the ribbon as influenced by said needles to enable the same to compact the wool and render the ribbon substantially uniform in density.

32. In a machine for operating on a crudely formed ribbon of metal wool, a covered passageway of substantially uniform cross sectional shape, means for rendering the ribbon substantially uniform in density and advancing it into the passageway, and means for conveying such ribbon through the passageway, the means for rendering the wool of uniform density including a plurality of packer needles engageable with the crudely formed ribbon, and springs acting on the packer needles to cause them to compact the wool, such conveying means retarding the feed of the ribbon as influenced by said packer needles to enable the same to compact the wool and render the wool substantially uniform in density, the means for conveying the wool through the passageway including a plurality of conveyor needles, having a four-way motion to enter the wool at a predetermined point, advance the wool, withdraw from it and reenter it at said first mentioned point, said needles being wedge shaped with their front edges substantially vertical to the direction of feed.

33. In a machine for operating on a crudely formed ribbon of metal wool, a passageway of substantially uniform cross sectional shape, means for rendering the ribbon substantially uniform in density and advancing it into the passageway, the means for rendering the wool of uniform density including a plurality of needles engageable with the crudely formed ribbon, and springs acting independently on needles arranged at different positions across the passageway to cause them to compact the wool, said needles being in the form of thin wedge shaped blades disposed parallel with each other and with the direction of feed of the wool with their forward edges approximately at right angles to said direction of feed, and means for conveying the ribbon through the passageway, such conveying means retarding the feed of the ribbon as influenced by said needles to enable the same to compact the wool and render the ribbon substantially uniform in density.

34. In a machine of the class described, a horizontal passageway of uniform cross section throughout the major portion of its length, means for forcing metal wool along the passageway while rendering the density of the wool substantially uniform and means for advancing the wool through the passageway, said means for advancing the wool including a needle carriage arranged below the passageway, a plurality of conveyor needles fixed with respect to the needle carriage, and movable through a wall of the passageway to engage the wool, means for imparting a four-way rectilinear motion to the needle carriage whereby to cause intermittent step by step advance of the wool, the means for forcing the wool along the tunnel and rendering its density uniform comprising a secondary needle carriage mounted on the first carriage means imparting to the secondary needle carriage an additional movement with respect to the first carriage, and needles on the second needle carriage partaking of the movement thereof whereby there is a difference in the feed between the needles on the two carriages to create a compacting action.

35. In a machine of the class described, a horizontal passageway of uniform cross section throughout the major portion of its length, means for forcing metal wool into the passageway while rendering the density of the wool substantially uniform and means for advancing the wool through the passageway, said means for advancing the wool including a needle carriage arranged below the passageway, a plurality of conveyor needles fixed with respect to the needle carriage, and movable through a wall of the passageway to engage the wool, means for imparting a four-way rectilinear motion to the needle carriage whereby to cause intermittent step by step advance of the wool, the means for feeding the wool into the tunnel and rendering its density uniform comprising a secondary needle carriage mounted on but movable with respect to the first carriage and needles on the second needle carriage; means to effect a substantially horizontal yielding forward throw of the second needle carriage in addition to the corresponding movement of its supporting carriage.

36. Mechanism for operating upon a crudely formed ribbon of metal wool to render its density substantially uniform including a passageway having a flaring mouth into which the wool is adapted to be packed, said passageway beyond said mouth being of restricted cross sectional area, a plurality of independently movable packer needles to engage the crudely formed ribbon and force it into the passageway, horizontal bars extending longitudinally of the ribbon and upon which the packer needles are mounted in sets, a movable support member, means for imparting a four-way movement to said support member, parallel links connecting each of said bars to said support member; springs acting independently on said sets of needles to advance them with respect to said support member through variable strokes in accordance with the back pressure of the wool on which the sets of needles operate, means for imparting a four-way movement to said support member longitudinally of said ribbon, means operable upon the retracting stroke of the carriage to tension the springs, latching means to hold the sets of packer needles against spring urged movement during that stroke of the carriage which moves the needles into engagement with the wool and to unlatch the sets of packer needles substantially at the beginning of the advancing stroke of the support member.

37. In a machine of the class described, means for engaging a crudely formed ribbon of metal wool of non-uniform density and rendering the same of substantially uniform density while advancing the ribbon, said means including a plurality of sets of impaling members, means for moving said members in a plane substantially at right angles to the path of travel of the wool, whereby to cause them to impale the wool, independent spring means under substantially uniform tension acting on the independent sets of members for drawing them in the direction of travel of the wool, whereby such travel is substantially inversely proportional to the density of the wool, means for withdrawing said members simultaneously from the wool and for simultaneously retracting them and again simultaneously moving them into wool impaling position and means to retard the feed of the ribbon as influenced by the needles to enable the same to compact the wool.

38. In a machine of the class described, mechanism for engaging a crudely formed ribbon of metal wool of non-uniform density and rendering the same of substantially uniform density while advancing the ribbon, said means including a plurality of sets of impaling members, means for moving said members in a plane substantially at right angles to the path of travel of the wool, whereby to cause them to impale the wool, independent spring means under substantially uniform tension acting on the independent sets of members for drawing them in the direction of travel of the wool, whereby such travel is substantially inversely proportional to the density of the wool, means for withdrawing said members simultaneously from the wool and for simultaneously retracting them and again simultaneously moving them into wool impaling position, a tunnel through which the wool is advanced, a plurality of wool impaling and conveying members working through the walls of the tunnel, and means for imparting a four-way rectilinear motion to said second mentioned impaling members, the effective forward feeding stroke of the second set of impaling members being materially less than the maximum spring throw of the first mentioned members.

39. In a machine of the class described, a wool homogenizing mechanism including a plurality of wool impaling and advancing members having a substantially four-way motion, means to move the members into wool impaling position, spring means under substantially uniform tension acting independently on the members to effect homogenizing of the wool by varying travel as they engage wool of varying density, latching means to hold the members against the action of said springs, means to simultaneously withdraw the needles from the wool and return them in latched condition to a point adjacent their point of entry into the wool, means for again causing the members to impale the wool, and means acting thereupon to release said latching means and permit free action of the springs to perform the next working stroke.

40. Mechanism for operating upon crudely formed ribbon of steel wool to render its density uniform including a passage through which the wool is conveyed; means feeding the wool through said passage at a definite predetermined rate of speed; packing means acting in advance of said feeding means to engage the wool, feed it forward, release it and return for another feed; and means adapted to operate said packing means at a faster feed than said feed means to compact the wool; such means for operating the packing means including means for feeding the packing means at the same rate as said feed means and other means urging said packing means forward at a faster rate under predetermined pressure whereby said wool will be compacted to the extent of said pressure.

41. Mechanism for operating upon crudely formed ribbon of steel wool to render its density uniform including a passage through which the wool is conveyed; means feeding the wool through said passage at a definite predetermined rate of speed; packing means acting in advance of said feeding means to engage the wool, feed it forward, release it and return for another feed, said packing means including a plurality of packing elements spaced apart laterally across the passage; and means adapted to operate said packing means at a faster feed rate than said feed means to compact the wool, such means for operating the packing means including means for feeding the packing means at the same rate as said feed means and other means individual to said packing elements for urging the same forward at a faster feed rate under predetermined pressure whereby said wool will be compacted to the extent of said pressure.

CROSBY FIELD.